US012528636B2

(12) United States Patent
Madanagopal et al.

(10) Patent No.: US 12,528,636 B2
(45) Date of Patent: *Jan. 20, 2026

(54) TEMPERATURE INSULATED PACKAGING SYSTEMS AND RELATED METHODS

(71) Applicant: LIFE TECHNOLOGIES CORPORATION, Carlsbad, CA (US)

(72) Inventors: Arunkumar Madanagopal, San Diego, CA (US); Eric Barnitz, Santa Monica, CA (US)

(73) Assignee: LIFE TECHNOLOGIES CORPORATION, Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/447,449

(22) Filed: Aug. 10, 2023

(65) Prior Publication Data

US 2024/0025623 A1 Jan. 25, 2024

Related U.S. Application Data

(63) Continuation of application No. 17/975,063, filed on Oct. 27, 2022, now Pat. No. 11,760,555, which is a
(Continued)

(51) Int. Cl.
*B65D 81/38* (2006.01)
*B65D 5/56* (2006.01)
(Continued)

(52) U.S. Cl.
CPC ......... *B65D 81/3823* (2013.01); *B65D 5/566* (2013.01); *B65D 5/6608* (2013.01); *B65D 65/466* (2013.01)

(58) Field of Classification Search
CPC .. B65D 81/3823; B65D 5/566; B65D 5/6608; B65D 65/466; B65D 81/3862;
(Continued)

(56) References Cited

U.S. PATENT DOCUMENTS 5,042,260 A 8/1991 George, Sr.
5,208,267 A 5/1993 Neumann et al.
(Continued)

FOREIGN PATENT DOCUMENTS

EP 1568614 B1 7/2008
FR 806166 A 12/1936
(Continued)

OTHER PUBLICATIONS

EP19877815.1, Extended European Search Report, Jul. 15, 2022, 5 pages.
(Continued)

*Primary Examiner* — Christopher R Demeree

(57) ABSTRACT

A temperature insulated packaging system includes a container having interior surface bounding an interior volume and a liner disposed within the interior volume and at least partially bounding a compartment configured to receive an item for temperature insulated shipping. The liner includes a first sleeve made of cellulose material and at least partially bounds a channel. The first sleeve has an outside wall disposed adjacent to the container and an opposing inside wall disposed adjacent to the compartment configured to receive the item for shipping, the channel being disposed between the inside wall and the outside wall. At least one insulation sheet is disposed within the channel of the first sleeve, the at least one insulation sheet being made of a cellulose material and having a plurality of recesses formed thereon.

18 Claims, 16 Drawing Sheets

Related U.S. Application Data continuation of application No. 17/245,781, filed on Apr. 30, 2021, now Pat. No. 11,511,927, which is a continuation of application No. PCT/US2019/059539, filed on Nov. 1, 2019.

(60) Provisional application No. 62/755,071, filed on Nov. 2, 2018.

(51) Int. Cl.
  *B65D 5/66* (2006.01)
  *B65D 65/46* (2006.01)

(58) Field of Classification Search
  CPC ..... B65D 81/3858; B65D 5/56; Y02W 90/10; Y02W 30/80; F25D 2331/804; B32B 2307/304; B32B 29/007
  USPC ............ 229/103.11, 117.35; 206/594; 220/592.01, 592.2; 62/60; 493/95
  See application file for complete search history.

(56) References Cited

U.S. PATENT DOCUMENTS

| | | |
|---|---|---|
| 5,441,170 A | 8/1995 | Bane, III |
| 5,564,570 A | 10/1996 | Jaszai |
| 5,897,017 A | 4/1999 | Lantz |
| 6,325,281 B1 | 12/2001 | Grogan |
| 6,619,500 B1 | 9/2003 | Lantz |
| 6,938,968 B2 | 9/2005 | Tanimoto et al. |
| 7,452,316 B2 | 11/2008 | Cals et al. |
| 8,617,684 B2 | 12/2013 | Nomura et al. |
| 8,763,811 B2 | 7/2014 | Lantz |
| 9,550,618 B1 | 1/2017 | Jobe |
| 9,751,683 B1* | 9/2017 | Jobe ................... B65D 81/3813 |
| 9,957,099 B2* | 5/2018 | White ................ B65D 81/3862 |
| 9,981,797 B2* | 5/2018 | Aksan ................ B65D 81/3816 |
| 10,551,110 B2* | 2/2020 | Waltermire ........... F25D 23/069 |
| 10,843,840 B2* | 11/2020 | Sollie ..................... B65D 25/02 |
| 11,078,008 B2* | 8/2021 | Dankbaar ................ B65D 5/56 |
| 11,214,427 B2* | 1/2022 | Collison ................. B29C 70/12 |
| 2003/0082357 A1 | 5/2003 | Gokay et al. |
| 2007/0000983 A1 | 1/2007 | Spurrell et al. |
| 2007/0051782 A1 | 3/2007 | Lantz |
| 2007/0158344 A1 | 7/2007 | Lin |
| 2008/0289302 A1 | 11/2008 | Vulpitta |
| 2010/0314397 A1 | 12/2010 | Williams et al. |
| 2011/0072847 A1 | 3/2011 | Crespo et al. |
| 2011/0100868 A1* | 5/2011 | Lantz ................. B65D 81/3853 206/584 |
| 2012/0097067 A1 | 4/2012 | Fascio |
| 2012/0279896 A1 | 11/2012 | Lantz |
| 2014/0319018 A1 | 10/2014 | Collison |
| 2016/0052692 A1 | 2/2016 | Branham |
| 2017/0327298 A1 | 11/2017 | Morasse et al. |
| 2017/0334622 A1 | 11/2017 | Menzel, Jr. |
| 2018/0155076 A1 | 6/2018 | Givens, Jr. |
| 2018/0257844 A1 | 9/2018 | S, Jr et al. |
| 2020/0262637 A1* | 8/2020 | Tattam ..................... B65D 5/12 |

FOREIGN PATENT DOCUMENTS

| | | |
|---|---|---|
| JP | H0539940 U | 5/1993 |
| JP | H05294341 A | 11/1993 |
| JP | H08198248 A | 8/1996 |
| JP | 2006062691 A | 3/2006 |
| JP | 2013238305 A | 11/2013 |
| KR | 101728767 B1 | 4/2017 |
| WO | WO-2014144428 A2 | 9/2014 |

OTHER PUBLICATIONS

PCT/US2019/059539, International Search Report and Written Opinion, Mar. 9, 2020, 20 pages.

EP23189897.4, Extended European Search Report, Nov. 30, 2023, 6 pages.

\* cited by examiner

TEMPERATURE INSULATED PACKAGING SYSTEMS AND RELATED METHODS

CROSS REFERENCE TO RELATED APPLICATIONS

This application is a continuation of U.S. patent application Ser. No. 17/975,063, filed Oct. 27, 2022, now U.S. Patent No. 11, 760, 555, which is a continuation of U.S. patent application Ser. No. 17/245,781, filed Apr. 30, 2021, now U.S. Pat. No. 11,511,927, which is a continuation of International Patent Application No. PCT/US2019/059539, filed Nov. 1, 2019, which claims priority to and the benefit of U.S. Provisional Application No. 62/755,071, filed Nov. 2, 2018. Each of the foregoing applications is incorporated herein by reference in its entirety.

BACKGROUND

1. The Field of the Disclosure

The present disclosure relates to temperature insulated packaging systems having improved insulating capabilities for shipping and related methods.

2. The Relevant Technology

To facilitate and extend the shelf life of some perishable products from manufacture through distribution, a temperature-controlled supply chain (sometimes referred to as a cold chain) is often required. An unbroken cold chain, for example, generally includes an uninterrupted series of storage and distribution activities, which consistently maintain a product's environment within a desired, relatively low, temperature range. Consequently, packaging used in cold chain shipments must often maintain a product's environment within the desired, relatively low temperature range for an extended period of time, thereby ensuring that the product's temperature stays within the proper temperature range for the entire duration of the cold chain, from manufacture to end use.

Products requiring cold chain shipment are typically cooled prior to shipment, then placed within a thermal insulating material, and shipped with only a modicum of ice or refrigerant to absorb the heat that flows from the environment external to the packaging through the insulation. For many years, molded expanded polystyrene ("EPS") containers have been used as a thermal insulating material for cold chain shipments. Perishable goods, for example, are generally placed within EPS containers (i.e., coolers), which are then in turn placed within cardboard shipping boxes.

While EPS containers provide satisfactory insulating qualities, as well as being generally light weight, EPS containers also pose issues. EPS, for example, is an "expanded," non-compressible material that consists of numerous small air bubbles formed in a polystyrene matrix. Accordingly, EPS's poor volume efficiency may increase shipment costs when transporting empty containers to a location for use, increase warehousing costs when storing containers prior to use, and increase product shipment costs by providing a container that is often larger than may be needed to contain the product, thereby costing more to ship and necessitating more coolant.

Growing concerns for the environment, including, for example, concerns about global warming and excessive packaging waste, have also driven various environmental concerns regarding EPS containers. EPS's poor volume efficiency, for example, results in a greater amount of container waste material that needs to be recycled and/or disposed of. Furthermore, EPS is not currently widely recyclable at all recycling facilities.

Consequently, various "green" or environmentally friendly packaging insulators, which use inflated air, foamed corn starch, or recycled EPS foam, have been developed for cold chain shipment applications. Such "green" options, however, still generally lack satisfactory volume efficiency (i.e., size of product to size of packaging) and viable (i.e., simple) recycling options. To replace conventional EPS and other insulating packaging materials, it may therefore be desirable to provide insulating packaging material that is not only made of a renewable resource, but also provides satisfactory insulating qualities and volume efficiency. It also may be desirable to provide insulating packaging material that offers a relatively simple recycling option using existing recycling infrastructure.

SUMMARY

In a first independent aspect of the disclosure, a temperature insulated packaging system includes:
- a container having interior surface bounding an interior volume; and
- a liner disposed within the interior volume of the container and at least partially bounding a compartment configured to receive an item for shipping, the liner comprising:
  - a first sleeve comprised of a first cellulose material and at least partially bounding a channel, the first sleeve having an outside wall disposed toward the container and an opposing inside wall disposed toward the compartment configured to receive the item for shipping, the channel being disposed between the inside wall and the outside wall; and
  - at least one insulation sheet disposed within the channel of the first sleeve, the at least one insulation sheet being comprised of a second cellulose material and having a plurality of recesses formed thereon.

In one embodiment, the cellulose material of the first sleeve has a thickness in a range between about 0.8 mm to about 4.8 mm.

In another embodiment, the cellulose material of the first sleeve comprises a folded sheet of paperboard.

In another embodiment, the sheet of paperboard is selected from corrugated, flat, and combinations thereof.

In another embodiment, the sheet of paperboard has a thickness in a range between about 0.8 mm to about 4.8 mm.

In another embodiment, the sheet of paperboard is more rigid than the at least one insulation sheet.

In another embodiment, the sheet of paperboard has a thickness that is greater than a thickness of the at least one insulation sheet.

In another embodiment, the sheet of paperboard is less rigid than the at least one insulation sheet.

In another embodiment, the paperboard comprises a tab and a slot, the tab being received within the slot so as to secure the paperboard in a continuous loop that encircles the channel.

In another embodiment, the paperboard comprises a plurality of spaced apart tabs and a plurality of spaced apart slots, the plurality of tabs being received within the plurality of slots so as to secure the paperboard in a continuous loop that encircles the channel.

Another embodiment further includes:
the first sleeve having a terminal end face with an opening that communicates with the channel; and
a cover flap projecting from the terminal end face of the first sleeve, the cover flap being folded so as to at least partially cover the opening.

In another embodiment, the folded cover flap sits directly against the interior surface of the container.

In another embodiment, the outside wall of the first sleeve is disposed directly against the interior surface of the container and the interior wall of the first sleeve at least partially bounds the compartment.

In another embodiment, the first sleeve disposed within the interior volume of the container has a U-shaped configuration.

In another embodiment, the channel of the first sleeve has a rectangular transverse cross section.

In another embodiment, the liner further includes:
a second sleeve at least partially bounding a channel, the second sleeve having an outside wall disposed toward the container and an opposing inside wall disposed toward the compartment configured to receive the item for shipping, the channel of the second sleeve being disposed between the inside wall and the outside wall of the second sleeve, the second sleeve being separate and discrete from the first sleeve and being positioned so that the compartment is at least partially disposed between the first sleeve and the second sleeve; and
at least one insulation sheet disposed within the channel of the second sleeve, the at least one insulation sheet being comprised of a cellulose material and having a plurality of recesses formed thereon.

Another embodiment further includes a first locking tab projecting from the first sleeve and a first locking slot being formed on the second sleeve, the first locking tab being received within the first locking slot so as to secure the first sleeve to the second sleeve.

In another embodiment, the first sleeve has a U-shaped configuration and the second sleeve has a U-shaped configuration.

Another embodiment further includes:
the second sleeve having a first terminal end face with an opening that communicates with the channel;
a first cover flap projecting from the first terminal end face of the second sleeve;
a first locking tab projecting from the first cover flap;
a first locking slot being formed on the second sleeve, the first locking tab being received within the first locking slot so as to secure the first sleeve to the second sleeve.

Another embodiment further includes:
the second sleeve having a second terminal end face opposite the first terminal end face with an opening that communicates with the channel;
a second cover flap projecting from the second terminal end face of the second sleeve;
a second locking tab projecting from the second cover flap;
a second locking slot being formed on the second sleeve, the second locking tab being received within the second locking slot so as to secure the first sleeve to the second sleeve.

In another embodiment, the first sleeve has a first sidewall and an opposing second sidewall that each extend between the outside wall and the inside wall, the first locking slot being formed on the first sidewall and the second locking slot being formed on the second sidewall.

Another embodiment further includes:
the first sleeve having an interior surface and an opposing exterior surface;
a coating of a water impermeable material being applied to at least the interior surface or the exterior surface of the first sleeve.

In another embodiment, the coating is comprised of plastic.

In another embodiment, the coating comprises polyethylene (PE), polylactide (PLA), a biodegradable polymer, or combinations thereof.

In another embodiment, the at least one insulation sheet is folded at least once.

In another embodiment, the at least one insulation sheet comprises a plurality of separate sheets of paper that are stacked together, each of the plurality of separate sheets of paper being comprised of a cellulose material and having a plurality of recesses formed thereon.

In another embodiment, the stacked plurality of separate sheets of paper are folded twice to form a tri-fold.

In another embodiment, the plurality of separate sheets of paper comprise at least 3, 10, 15, 20, 25 or 30 sheets of paper.

In another embodiment, the plurality of separate sheets of paper are folded so that there are at least 5, 10, 15, 20, 25, or 30 vertically stacked layers of the plurality of separate sheets of paper.

Another embodiment further includes:
a first flat sheet having a top surface and an opposing bottom surface; and
a first embossed sheet having a top surface, an opposing bottom surface, and a plurality of spaced apart first embossings, each first embossing outwardly projecting from the top surface and terminating at a terminal end and bounding a recess openly exposed on the bottom surface, the terminal end of the first embossings being secured to the bottom surface of the first flat sheet by an adhesive.

Another embodiment further includes:
a second flat sheet having a top surface and an opposing bottom surface; and
the first embossed sheet further comprising a plurality of spaced apart second embossings, each second embossing outwardly projecting from the bottom surface and terminating at a terminal end and bounding a recess openly exposed on the top surface, the terminal end of the second embossings being secured to the top surface of the second flat sheet by an adhesive so that the first embossed sheet is disposed between the first flat sheet and the second flat sheet.

Another embodiment further includes a second embossed sheet having a plurality outwardly of projecting embossings, the embossings of the second embossed sheet being secured to the top surface of the first flat sheet by an adhesive.

In another embodiment, the at least one insulation sheet comprises a sheet of paper having a thickness in a range between about 0.15 mm to about 0.4 mm.

In another embodiment, the at least one insulation sheet comprises a sheet of cellulose wadding.

In another embodiment, the at least one insulation sheet comprises a sheet of embossed tissue paper.

In another embodiment, the at least one insulation sheet comprises a plurality of vertically stacked insulation sheets, a plurality of pockets being bound between the plurality of vertically stacked insulation sheets.

In another embodiment, the liner extends over the interior surface of the container so as to enclose the compartment configured to receive the item for shipping.

In another embodiment, the liner has a thickness of at least 0.5 cm, 1 cm, or 1.5 cm.

In another embodiment, the liner has an insulation rating (R Value) of in a range between about 3.5/inch to about 4.5/inch measured at a mean temperature of 75° F.

In another embodiment, the container comprises a box and is comprised of a cellulose material.

In another embodiment, the cellulose material of the container comprises paperboard.

In another embodiment, the paperboard comprises corrugated paperboard.

Another embodiment further includes:
the container having an interior surface and an opposing exterior surface; and
a coating of a water impermeable material being applied to at least the interior surface or the exterior surface of the container.

In another embodiment, the coating is comprised of plastic.

In another embodiment, the coating comprises polyethylene (PE), polylactide (PLA), a biodegradable polymer, or combinations thereof.

In another embodiment, the container and the liner do not comprise expanded polystyrene or non-biodegradable plastics.

In another embodiment, a cold source is disposed within the interior volume.

In another embodiment, the cold source comprises dry ice.

In another embodiment, the cold source comprises at least one frozen gel pack.

In another embodiment, the cold source is disposed within the compartment configured to receive the item for shipping and is encircled by the liner.

In another embodiment, the cold source comprises the item for shipping.

In another embodiment, the cold source is configured to cool at least a portion of the compartment to a temperature less than 11° C. prior to shipment.

Another embodiment further includes the item for shipping, the item for shipping being disposed within the interior volume.

In another embodiment, the cold source is disposed above and below the item for shipping.

In another embodiment, the cold source completely encircles the item for shipping.

In another embodiment, the item for shipping comprises a biological material.

In another embodiment, the first cellulose material of the first sleeve and the second cellulose material of the at least one insulation sheet comprises the same cellulose material or a different cellulose material.

In another embodiment, the liner encircles the compartment configured to receive the item for shipping.

Another embodiment further includes:
a first sidewall and an opposing second sidewall that each extend between the outside wall and the inside wall; and
a first slot and a spaced apart second slot that pass through the inside wall so as to communicate with the channel and extend between the first side wall and the second sidewall.

Another embodiment further includes:
a first V-shaped notch extending through the first sidewall and intersecting with the first slot; and
a second V-shaped notch extending through the first sidewall and intersecting with the second slot.

A second independent aspect of the disclosure includes:
positioning a liner along an interior surface of a container so that the liner at least partially bounds a compartment within the container, the liner comprising:
a first sleeve comprised of a first cellulose material and at least partially bounding a channel, the first sleeve having an outside wall disposed toward the container and an opposing inside wall disposed toward the compartment when positioned within the container, the channel being disposed between the inside wall and the outside wall; and
at least one insulation sheet disposed within the channel of the first sleeve, the at least one insulation sheet being comprised of a second cellulose material and having a plurality of recesses formed thereon;
disposing a cold source within the container; and disposing an item for shipping within the compartment within the container, wherein the liner insulates the item for shipping during shipping.

In one embodiment, the liner is removably disposed within the container.

In another embodiment, the first sleeve has a U-shaped configuration when positioned within the container.

Another embodiment further includes:
a second sleeve comprised of cellulose material and at least partially bounding a channel; and
at least one insulation sheet disposed within the channel of the second sleeve, the at least one insulation sheet being comprised of a cellulose material and having a plurality of recesses formed thereon,
wherein the second sleeve has a U-shaped configuration when positioned within the container.

Another embodiment further includes inserting a locking tab projecting from the second sleeve into a locking slot formed on the second sleeve so as to couple the second sleeve to the first sleeve.

Another embodiment further includes a biological material.

In another embodiment, the first sleeve comprises a folded sheet of paperboard.

In another embodiment, the sheet of paperboard is more rigid than the at least one insulation sheet.

In another embodiment, the sheet of paperboard is less rigid than the at least one insulation sheet.

In another embodiment, the channel of the first sleeve has a rectangular transverse cross section.

In another embodiment, the at least one insulation sheet comprises a plurality of separate sheets of paper that are stacked together, each of the plurality of separate sheets of paper being comprised of a cellulose material and having a plurality of recesses formed thereon In another embodiment, the stacked plurality of separate sheets of paper are folded.

In another embodiment, the plurality of separate sheets of paper comprise at least 3, 5, 10, 15, 20, 25, or 30 sheets of paper.

In another embodiment, the at least one insulation sheet comprises a sheet of embossed cellulose wadding.

In another embodiment, the container comprises a cardboard box.

In another embodiment, the cold source comprises dry ice.

In another embodiment, the cold source comprises at least one frozen gel pack.

In another embodiment, the liner has an insulation rating (R Value) of in a range between about 3.5/inch to about 4.5/inch measured at a mean temperature of 75° F.

A third independent aspect of the present disclosure includes:
- folding a sheet of paperboard around a plurality of insulation sheets so that the sheet of paperboard encircles the plurality of insulation sheets, the sheet of paperboard and the plurality of insulation sheets combining to form a first liner portion; and
- positioning the first liner portion within an interior volume of a container.

One embodiment further includes inserting a tab of the sheet of paperboard into a slot of the sheet of paperboard so as to form the sheet of paperboard into a continuous loop that encircles the plurality of insulation sheets.

In another embodiment, each of the plurality of insulation sheets are secured together by an adhesive.

In another embodiment, some of the plurality of insulation sheets are flat while others of the plurality of insulation sheets have embossing.

In another embodiment, the plurality of insulation sheets comprise a plurality of stacked sheets of paper that are not secured together by an adhesive, each sheet of paper being comprised of a cellulose material and having a plurality of recesses formed thereon.

In another embodiment, the plurality of insulation sheets comprise at least 3, 5, 10, 20, 25, or 30 sheets of paper.

Another embodiment further includes folding over the plurality of insulation sheets prior to folding the sheet of paperboard around the plurality of insulation sheets.

In another embodiment, the sheet of paperboard is folded to form a rectangular channel in which the plurality insulation sheets are disposed.

In another embodiment, the first liner disposed within the interior volume of the container has a U-shaped configuration.

In another embodiment, the sheet of paperboard is selected from corrugated, flat, and combinations thereof.

In another embodiment, the sheet of paperboard has a thickness in a range between about 0.8 mm to about 4.8 mm.

In another embodiment, the sheet of paperboard is more rigid than the plurality insulation sheets.

Another embodiment further includes a coating of a water impermeable material being applied to at least an interior surface or an exterior surface of the paperboard.

In another embodiment, the coating is comprised of plastic.

In another embodiment, the coating comprises polyethylene (PE), polylactide (PLA), a biodegradable polymer, or combinations thereof.

In another embodiment, the first liner has an insulation rating (R Value) of in a range between about 3.5/inch to about 4.5/inch measured at a mean temperature of 75° F.

A fourth independent aspect of the present disclosure includes:
- a container having interior surface bounding an interior volume; and
- a liner disposed within the interior volume of the container and encircling a compartment configured to receive an item for shipping, the liner comprising a first liner portion that includes a plurality of stacked insulation sheets that are secured together by an adhesive, some of the plurality of stacked insulation sheets being flat while others of the plurality of stacked insulation sheets have embossing, each of the plurality of stacked insulation sheets being comprised of a cellulose material.

Another embodiment further includes the plurality of stacked insulation sheets of the first liner portion comprising:
- a first flat sheet having a top surface and an opposing bottom surface; and
- a first embossed sheet having a top surface, an opposing bottom surface, and a plurality of spaced apart first embossings, each first embossing outwardly projecting from the top surface and terminating at a terminal end and bounding a recess openly exposed on the bottom surface, the terminal end of the first embossings being secured to the bottom surface of the first flat sheet by the adhesive.

In another embodiment, the plurality of stacked insulation sheets of the first liner portion further comprising:
- a second flat sheet having a top surface and an opposing bottom surface; and
- the first embossed sheet further comprising a plurality of spaced apart second embossings, each second embossing outwardly projecting from the bottom surface and terminating at a terminal end and bounding a recess openly exposed on the top surface, the terminal end of the second embossings being secured to the top surface of the second flat sheet by the adhesive so that the first embossed sheet is disposed between the first flat sheet and the second flat sheet.

Another embodiment further includes a second embossed sheet having a plurality of outwardly projecting embossings, the embossings of the second embossed sheet being secured to the top surface of the first flat sheet by the adhesive.

In another embodiment, the plurality of stacked insulation sheets are not encircled by a sheet of paperboard.

In another embodiment, the first liner portion has a U-shaped configuration.

In another embodiment, the liner comprises a second liner portion that includes a plurality of stacked insulation sheets that are secured together by an adhesive, some of the plurality of stacked insulation sheets being flat while others of the plurality of stacked insulation sheets having embossing, each of the plurality of stacked insulation sheets being comprised of a cellulose material, the second liner portion having a U-shaped configuration.

A fifth independent aspect of the disclosure includes:
- positioning a liner along an interior surface of a container so that the liner at least partially bounds a compartment within the container, the liner comprising a first liner portion that includes a plurality of stacked insulation sheets that are secured together by an adhesive, some of the plurality of stacked insulation sheets being flat while others of the plurality of stacked insulation sheets have embossing, each of the plurality of stacked insulation sheets being comprised of a cellulose material;
- disposing a cold source within the container; and
- disposing an item for shipping within the compartment within the container, wherein the liner insulates the item for shipping during shipping.

In one embodiment, the first liner portion has a U-shaped configuration.

In another embodiment, the liner comprises a second liner portion that includes a plurality of stacked insulation sheets that are secured together by an adhesive, some of the plurality of stacked insulation sheets being flat while others of the plurality of stacked insulation sheets having embossing, each of the plurality of stacked insulation sheets being comprised of a cellulose material, the second liner portion having a U-shaped configuration.

Each of the above independent aspects of the present disclosure may further include any of the features, options and possibilities set out elsewhere in this document, including the features and options set forth above under each of the above independent aspects.

BRIEF DESCRIPTION OF THE DRAWINGS

Various embodiments of the present disclosure will now be discussed with reference to the appended drawings. It is appreciated that these drawings depict only typical embodiments of the disclosure and are therefore not to be considered limiting of its scope.

DETAILED DESCRIPTION

Figure 1:
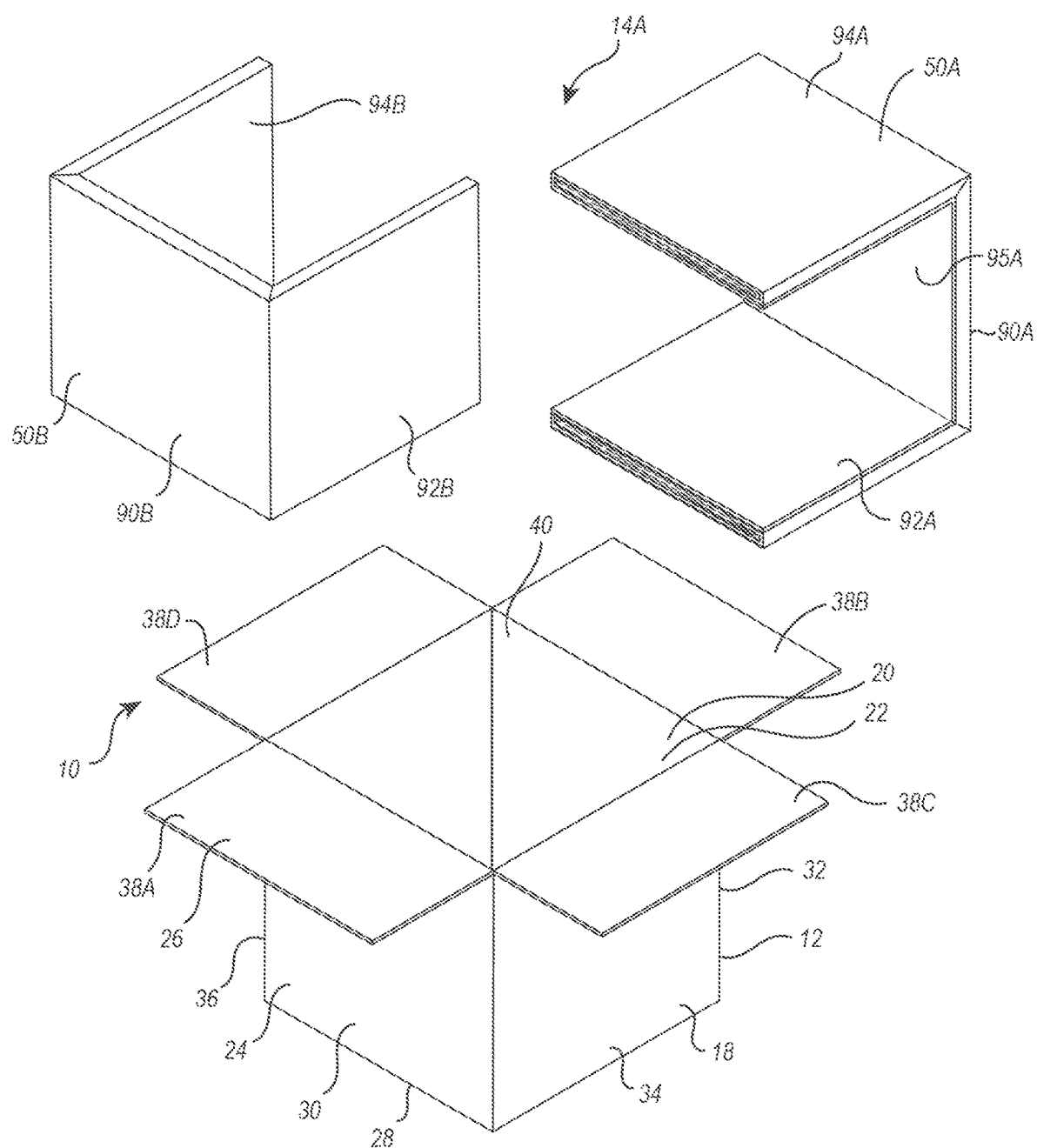
FIG. 1 is a partially exploded perspective view of a packaging system including a container and a liner for the container.

Before describing the present disclosure in detail, it is to be understood that this disclosure is not limited to particularly exemplified structures, systems, methods, or process parameters that may, of course, vary. It is also to be understood that the terminology used herein is only for the purpose of describing particular embodiments of the present disclosure and is not intended to limit the scope of the disclosure in any manner.

All publications, patents, and patent applications cited herein, whether supra or infra, are hereby incorporated by reference in their entirety to the same extent as if each individual publication, patent, or patent application was specifically and individually indicated to be incorporated by reference.

The term "comprising" which is synonymous with "including," "containing," or "characterized by," is inclusive or open-ended and does not exclude additional, unrecited elements or method steps.

It will be noted that, as used in this specification and the appended claims, the singular forms "a," "an" and "the" include plural referents unless the content clearly dictates otherwise. "Thus, for example, reference to a "sheet" includes one, two, or more sheets.

As used in the specification and appended claims, directional terms, such as "top," "bottom," "left," "right," "up," "down," "upper," "lower," "proximal," "distal" and the like are used herein solely to indicate relative directions and are not otherwise intended to limit the scope of the disclosure or claims.

Where possible, like numbering of elements have been used in various figures.

Furthermore, multiple instances of an element and or sub-elements of a parent element may each include separate letters appended to the element number. For example, two instances of a particular element "10" may be labeled as "10A" and "10B". In that case, the element label may be used without an appended letter (e.g., "10") to generally refer to all instances of the element or any one of the elements. Element labels including an appended letter (e.g., "10A") can be used to refer to a specific instance of the element or to distinguish or draw attention to multiple uses of the element. Furthermore, an element label with an appended letter can be used to designate an alternative design, structure, function, implementation, and/or embodiment of an element or feature without an appended letter. Likewise, an element label with an appended letter can be used to indicate a sub-element of a parent element. For instance, an element "12" can comprise sub-elements "12A" and "12B."

Various aspects of the present devices and systems may be illustrated by describing components that are coupled, attached, and/or joined together. As used herein, the terms "coupled", "attached", and/or "joined" are used to indicate either a direct connection between two components or, where appropriate, an indirect connection to one another through intervening or intermediate components. In contrast, when a component is referred to as being "directly coupled", "directly attached", and/or "directly joined" to another component, there are no intervening elements present. Furthermore, as used herein, the terms "connection," "connected," and the like do not necessarily imply direct contact between the two or more elements.

Various aspects of the present devices, systems, and methods may be illustrated with reference to one or more exemplary embodiments. As used herein, the term "embodiment" means "serving as an example, instance, or illustration," and should not necessarily be construed as preferred or advantageous over other embodiments disclosed herein.

Unless defined otherwise, all technical and scientific terms used herein have the same meaning as commonly understood by one of ordinary skill in the art to which the present disclosure pertains. Although a number of methods and materials similar or equivalent to those described herein can be used in the practice of the present disclosure, the preferred materials and methods are described herein.

In general, the present disclosure relates to temperature insulated packaging systems and related methods of manufacture and use that can be used for shipping perishable materials, such as biological materials, food products, pharmaceutical drugs, and chemicals, that need to be shipped at a controlled temperature to maintain their viability or usefulness. Such packaging systems can be used as part of a cold chain shipping process.

Depicted in FIG. 1 is one embodiment of a temperature insulated packaging system that includes a container 12 and a liner 14A that is designed to be received within container 12. As discussed below in greater detail, packaging system 10 can further comprise a cold source and an item for shipping that can also be positioned within container 12.

Container 12 has an exterior surface 18 and an interior surface 20. Interior surface 20 bounds an interior volume 22. In the embodiment depicted, container 12 is in the form of a square or rectangular box or cube having an encircling sidewall 24 extends between a top wall 26 and an opposing bottom wall 28. Encircling sidewall 24 can comprise a front wall 30 and an opposing back wall 32 that are disposed in parallel alignment and that extend between opposing sidewalls 34 and 36. Sidewalls 34 and 36 are also disposed in parallel alignment. Each of the walls can be square or rectangular. As depicted, top wall 26 can comprise a plurality of panels 38A, 38B, 38C, and 38D that are hingedly mounted, such as by a living hinge, to the upper ends of walls 30, 32, 34, and 36, respectively. Panels 38 can outwardly fold, as shown in FIG. 1, to open a top access 40 to interior volume 22. Panels 38 can also be inwardly folded so as to cover and enclose interior volume 22. Bottom wall 32 can also be comprised of a plurality of panels that are hingedly mounted to the lower end of walls 30, 32, 34, and 36 and can operate in the same way as panels 38.

In other embodiments, container 12 can have different configurations. For example, encircling sidewall 24 of container 12 need not have a square or rectangular transverse cross section but can be circular, oval or have other polygonal transverse cross sections that extend between a top wall and an opposing bottom wall. Other shapes and configurations can also be used.

The size of container 12, and thus the size of interior volume 22, can vary depending in part on the size of the item to be shipped and the duration that the item needs to be kept cold therein. In some embodiments, container 12 can be sized so that interior volume 22 has a volume of at least or less than 1,500 cm$^3$, 3,000 cm$^3$, 8,000 cm$^3$, 0.027 m$^3$, 0.125 m$^3$ or is in a range between any two of the foregoing values. Other volumes can also be used.

Container 12 is commonly comprised of one or more flexible sheets comprised of cellulose material, such as wood, cotton, cloth, and/or recycled paper. More commonly, container 12 is comprised of one or more sheets of paper such as paperboard. The paperboard can be flat (i.e., have no corrugation), corrugated or be the combination thereof. The paperboard commonly comprises cardboard, such as corrugated cardboard. Thus, container 12 can comprise a conventional cardboard box. The flexible paperboard or cardboard used to form container 12 is typically foldable and has a thickness in the range of between 0.8 mm and 5 mm and more commonly between 0.8 mm and 3 mm or between 1 mm and 3 mm.

To help improve the insulating capability of container 12, a water impermeable coating can be applied on exterior surface 18 and/or interior surface 20. The coating can be a plastic. The coating is preferably a biodegradable material such as a biodegradable polymer like polyethylene (PE) or polylactide (PLA). The coating can be sprayed, painted, printed, or otherwise applied during or after the formation of the sheet used to form container 12. The coating could also be applied while container 12 is being formed or after container 12 is formed.

In the embodiment depicted in FIG. 1, liner 14A comprises a first liner portion and a second liner portion 50B that can both be selectively folded into a U-shaped configuration. Turing to FIG. 2, liner portion 50A is unfolded into a flat configuration. In general, liner portion 50A comprises a tubular sleeve 52A that bounds a channel 54A extending along the length thereof. In the depicted embodiment, channel 54A has a rectangular transverse cross section. Disposed within channel 54A are one or more insulation sheets 56A. More specifically, tubular sleeve 52A comprises an outside wall 58A and an opposing inside wall that both longitudinally extend between a first end 62A and an opposing second end 64A and that extend laterally between a first sidewall 66A and an opposing second sidewall 68A. Channel 54A is bounded between interior surfaces of outside wall 58A and inside wall 60A and between interior surfaces of sidewalls 66A and 68A. Liner portion 50A has a thickness $T_1$ extends between the outside faces of outside wall 58A an inside wall 60A that is typically at least or less than 0.5 cm, 1 cm, 1.5 cm, 2 cm, or 3 cm or is in a range between any two of the foregoing values. As discussed below in more detail, the length and width of liner portion 50A can depend upon the size of container 12.

Figure 2:
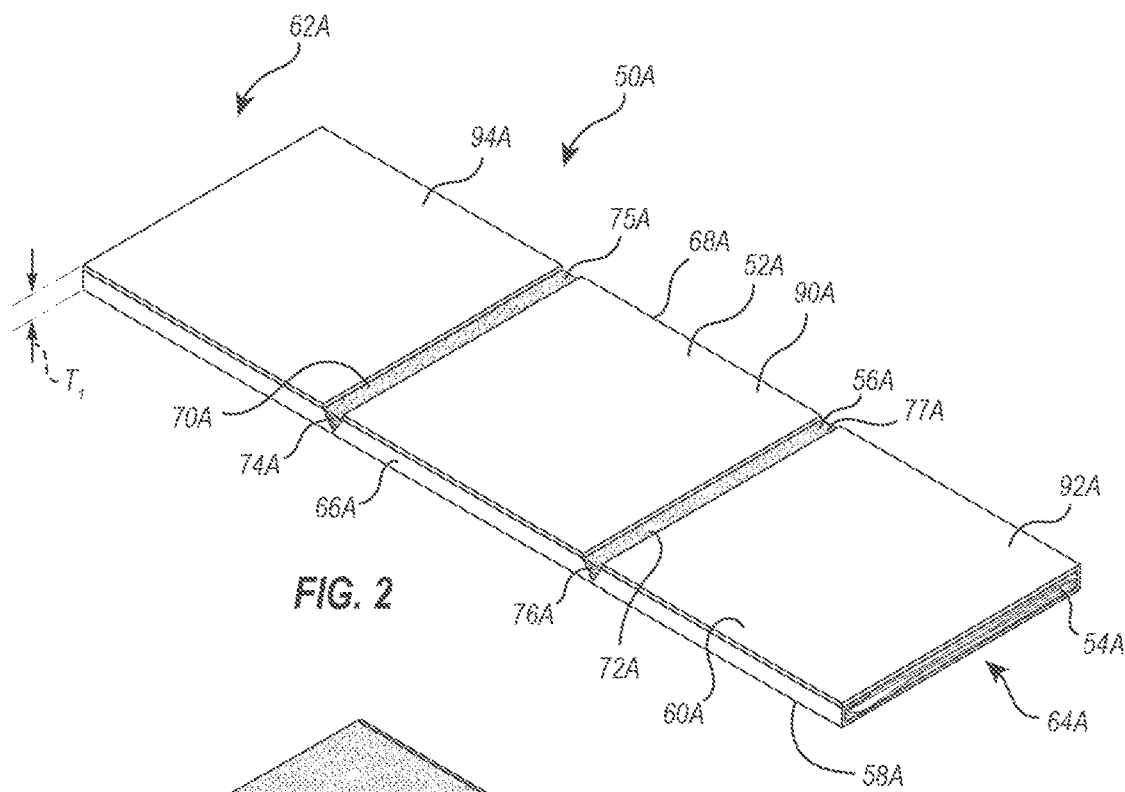
FIG. 2 is a perspective view of one of the liner portions shown in FIG. 1 laid flat.

As also shown in FIG. 2, a pair of spaced apart slots 70A and 72A pass through inside wall 60A to channel 54A and extend between sidewalls 66A and 68A. Extending through first sidewall 66A so as to communicate with channel 54A and intersect with slots 70A and are V-shaped notches 74A and 76A, respectively. Likewise V-shaped notches 75A and 77A (FIG. 3) extend through second sidewall 68A so as to communicate with channel 54A and intersect with slots 70A and 72A. The slots and notches enable first liner portion 50A to easily fold and unfold between the flat configuration shown in FIG. 2 and the U-shaped configuration shown in FIG. 1 while maximizing the insulating capability of liner portion 50A. For example, when liner portion 50A is folded into the U-shaped configuration, the opposing edges of each slot and the opposing edges of each notch are mated together or are closely adjacently disposed. As a result, the inside corners of liner portion 50A are bounded on opposing sides by outside wall 58 and inside wall 60 and also by opposing sidewalls 66 and 68. Thus, the insulating capability of liner portion 50A at the inside corners is the same or substantially the same as that of the faces of liner portion 50A spaced apart from the inside corners. In other embodiments, the slots and/or notches could be covered by a flexible sheet or film or they could be eliminated and the material at those locations pleated or otherwise processed or treated to enable easy bending but still help maintain insulating capability.

Figure 3:
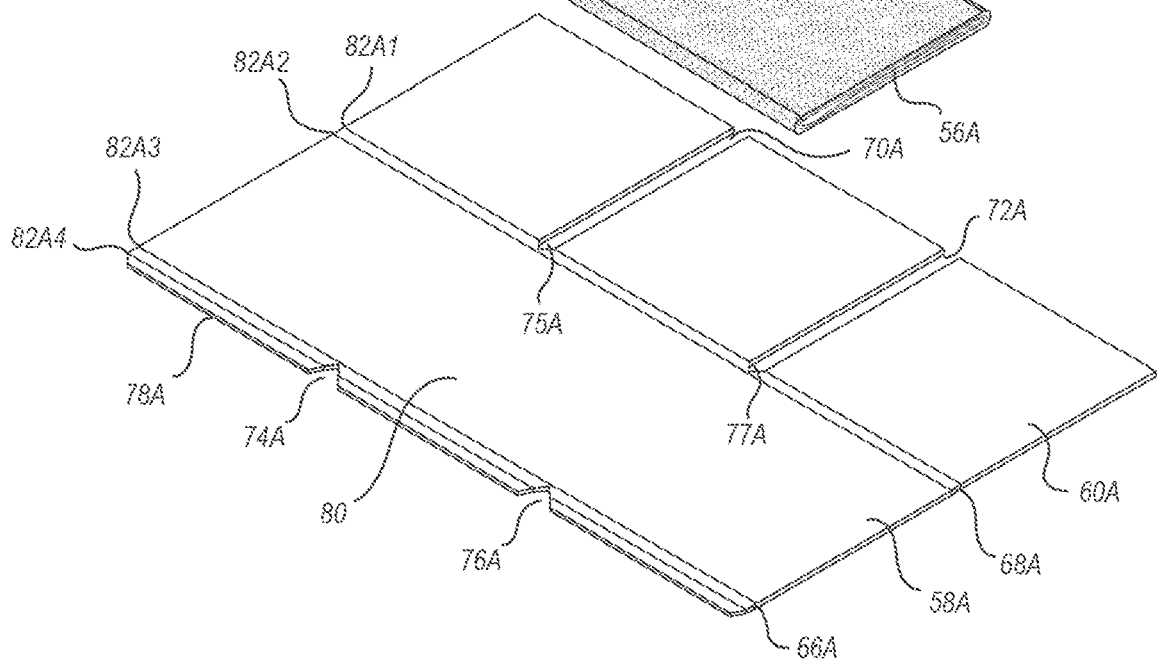
FIG. 3 is an exploded perspective view of the liner portion shown in FIG. 2.

Tubular sleeve 52A is typically made from a sheet of flexible/foldable material that is cut or otherwise formed into a blank 80, as shown in FIG. 3, and then folded and secured into sleeve 52A. The sheet of material used to form sleeve 52A can be any of the same materials used to form container 12, as discussed above. For example, sleeve 52A is typically made from a sheet comprised of a cellulose material and commonly comprises a sheet of paper such as paperboard. The paperboard can be flat or corrugated and commonly comprises cardboard or corrugated cardboard. The thickness and composition of the sheet that forms sleeve 52A can also be the same as discussed above with regard to the sheet used to form container 12.

Prior to or after blank 80 is formed into the desired configuration, fold lines 82 can be formed on blank 80. Specifically, a fold line 82A1 is formed at the intersection between inside wall 60A and second sidewall 68A, a fold line 82A2 is formed at the intersection between outside wall 58A and second sidewall 68A, a fold line 82A3 is formed at the intersection between outside wall 58A and first sidewall 66A and a fold line 82A4 is formed at the intersection between first sidewall 66A and a tab 78A projecting from first sidewall 66A. The fold lines 82 can be formed by pinching or compressing the sheet together along the location for the fold line or by using other conventional techniques used in forming fold lines in blanks for conventional cardboard boxes. When blank 80 is folded into the desired configuration for sleeve 52A, tape, adhesive or locking structures can be used to hold sleeve 52A in the tubular configuration. In the embodiment depicted in FIG. 3, tab 78A is formed projecting from the edge of sidewall 66A. When blank 80 is folded into sleeve 52A, tab 78A can be positioned either above or below inside wall 60A. Adhesive can be applied to tab 78A to permanently secure sidewall 66A to inside wall 60A so as to secure sleeve 52A in the continuous loop.

As with container 12, to help improve the insulating capability of sleeve 52A, a water impermeable coating can be applied on an exterior surface and/or interior surface of blank 80 or formed sleeve 52A. That is, the coating can be sprayed, painted, printed, or otherwise applied during or after the formation of blank 80. The coating could also be applied while sleeve 52A is being formed or after sleeve 52A is formed. The coating can comprise a plastic and is commonly a biodegradable material such as a biodegradable polymer like polyethylene (PE) or polylactide (PLA).

Insulation sheets 56A comprise flexible/foldable sheets that are comprised of cellulose material such as wood, cotton, rice, cloth, and/or recycled paper. Typically, insulation sheets 56A comprise sheets of paper and more commonly comprise wadding, dunnage or tissue paper. Other types of paper can also be used. Each sheet of insulation sheets 56A is typically thinner, more flexible, and less rigid than the sheet of material used to form container 12 and/or sleeve 52A. In some embodiments, each sheet of insulation sheets 56A can have a thickness that is less than 1 mm, 0.5 mm, 0.4 mm, 0.25 mm or 0.15 mm or is in a range between any two of the foregoing values, e.g., the thickness can be in a range between 0.4 mm and 0.15 mm. Other thicknesses can also be used. One common way to measure paper is "lb bond," which is the pound weight per 500 sheets. Using this measurement, the lb bond measurement increases as the thickness of the sheets increases. In some embodiments of the present disclosure, each sheet of insulation sheets 56A can have a lb bond measurement that is at least or less then 5, 15, 20, 25, or 30 or is in a range between any two of the foregoing values, e.g., the lb bond measurement can be in a range between 5 and 15. Other measurements can also be used.

The thickness of each sheet of insulation sheets 56A is commonly less than 60% or 40% the thickness of the sheets used to form container 12 and/or sleeve 52A. One or more insulation sheets 56A can be used in the formation of liner portion 50A. The number of separate sheets used in insulation sheets 56A of liner portion 50A is commonly at least or less than 3, 10, 15, 20, 25, or 30 sheets or is in range between any two of the foregoing values. For example, the number of separate sheets used in insulation sheets 56A is commonly in a range between 5 and 30.

Figures 4A, 4B, 4C:
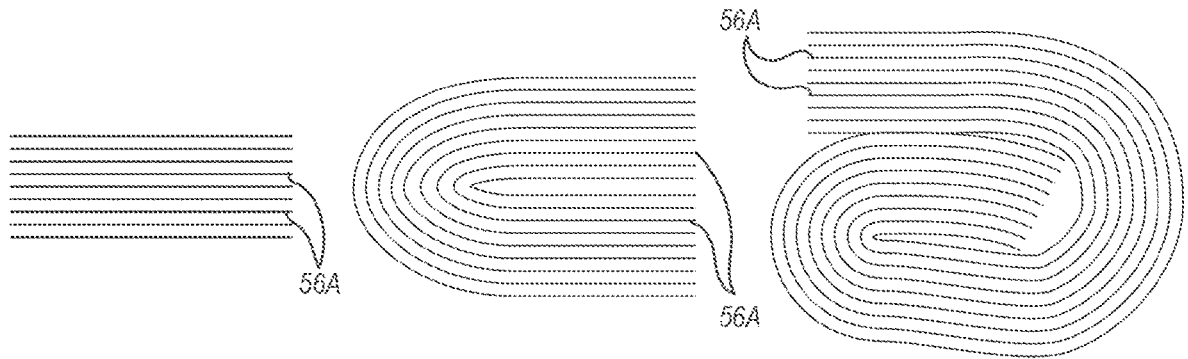
FIG. 4A is a cross sectional view of the insulation sheets of the liner portion shown in FIG. 3.
FIG. 4B is a cross sectional view an alternative arrangement of the insulation sheets shown in FIG. 4A where the insulation sheets are folded.
FIG. 4C is a cross sectional view of an alternative arrangement of the insulation sheets shown in FIG. 4A wherein the insulation sheets are folded in a tri-fold.

Insulation sheets 56A are disposed so as to produce vertically stacked, overlapping layers. The number of vertically stacked, overlapping layers is typically at least 5, 10, 15, 20, or 30 and is commonly in a range between 5 layers and 30 layers with between 10 layers and 25 layers or between 15 layer and 25 layers being more common. The number of desired layers can be achieved by either vertically stacking separate discrete insulation sheets 56A equal to the desired number of layers, as shown in FIG. 4A, or by folding over a select number of insulation sheets 56 one, two, three or more times so as to achieve the desired number of layers. For example, FIG. 4A shows nine discrete insulation sheets 56A vertically stack with no folding to produce 9 vertical, overlapping layers. FIG. 4B shows nine discrete insulation sheets 56A that have been vertically stacked and then folded once on top of itself to produce 18 vertically stacked, overlapping layers. Similarly, FIG. 4C shows nine discrete insulation sheets 56A that have been vertically stacked and then folded twice on top of itself to produce a trifold having 27 vertically stacked, overlapping layers. Other arrangements can also be used. For example, in contrast to vertically stacking insulation sheets 56A and then concurrently folding over all of the sheets, each individual insulation sheet 56A can first be folded a desired number of times and then the individual folded sheets can be vertically stacked to achieve the desired number of overlapping layers.

Figure 5A:
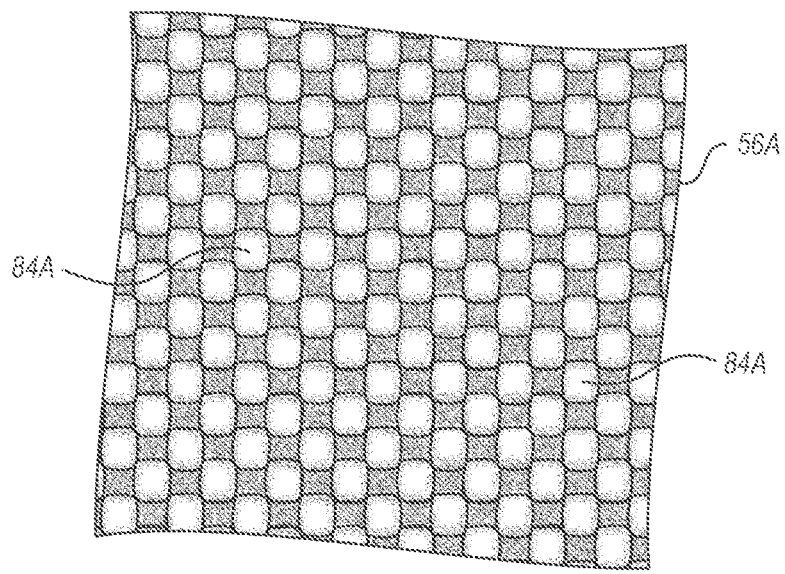
FIG. 5A is a top plan view of one of the insulation sheets shown in FIG. 3 having recesses formed thereon.
Figures 5B, 5C, 5D, 5E:
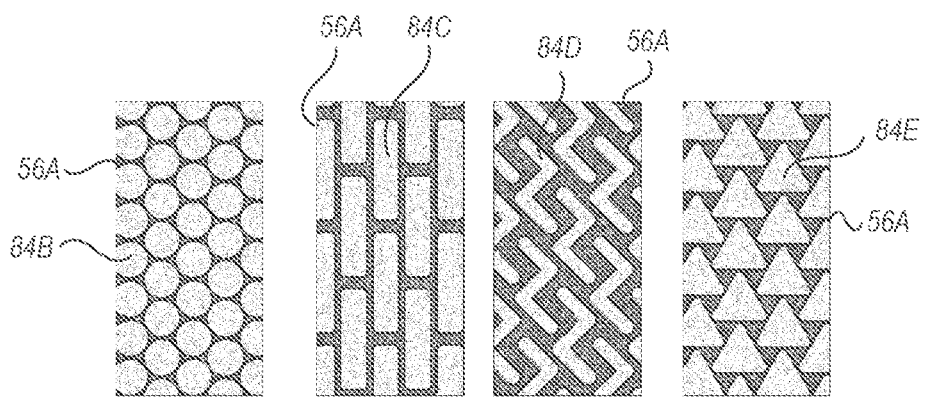
FIG. 5B is a top plan view of an alternative insulation sheet having circular recesses thereon.
FIG. 5C is a top plan view of an alternative insulation sheet having rectangular recesses formed thereon.
FIG. 5D is a top plan view of an alternative insulation sheet having Z-shaped recesses formed thereon.
FIG. 5E is a top plan view of an alternative insulation sheet having triangular recesses formed thereon.

As depicted in FIG. 5A, to help improve the insulating capability of insulation sheets 56A, each of insulation sheets 56 can be formed with a plurality of recesses 84 on one or both of the opposing faces thereof. Recesses 84 can be formed in a variety of different ways and can have a variety of different sizes and shapes. In one embodiment, recesses 84 can be embossed into insulation sheets 56 using conventional embossing techniques. Each recess 84 can have a perimeter that is polygonal, irregular or have other desired configurations. For Example, recesses 84A shown in FIG. 5A have a square perimeter, recesses 84B shown in FIG. 5B having a circular perimeter, recesses 84C shown in FIG. 5C having an elongated rectangular perimeter, recesses 84D shown in FIG. 5D having a substantially Z-shaped perimeter, and recesses 84E shown in FIG. 5E have a triangular perimeter.

Figure 6:
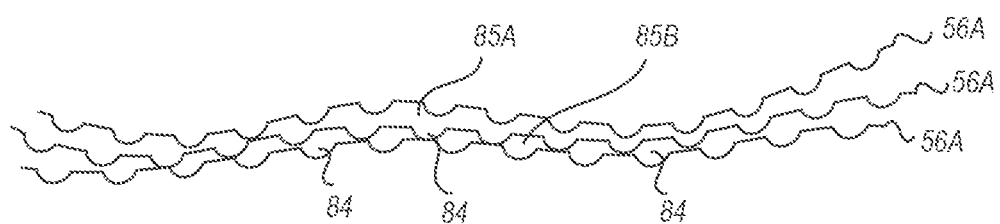
FIG. 6 is a cross sectional view of a plurality of stacked insulation sheets having pockets formed therebetween.

One of the goals of overlapping insulation sheets 56A into layers is to trap air or some other gas within pockets bounded between each adjacent pair of insulation sheets 56A. The pockets of trapped air help to improve the insulating capability insulating sheets 56A. For example, depicted in FIG. 6 is a cross sectional side view of a few vertically stacked insulating sheets 56A. Because of the embossing, folding and other forces acting on insulating sheets 56A, insulating sheets 56A do not necessarily lay flat on top of each other. That is, some of insulating sheets 56A can curve or bend resulting in spaced apart contact between adjacent insulation sheets 56A. Pockets 85 are formed between sheets 56A and are separated by regions where insulation sheets 56A directly contact. Pockets 85 can thus be different sizes and shapes. For example, as shown in FIG. 6, where adjacent insulation sheets are separated, a pocket, such as pocket 85A, can be formed that includes the area of the space between the separated insulation sheets 56A and the area of the multiple recesses 84 that communicate with the space. In other situation where the overlapping sheets 56A are directly contacting each other, a pocket, such as pocket 85B, may only comprise the area of a single recess 84. However, by forming recesses 84 into sheets 56A the number of formed pockets 85 per unit area is increased relative to overlapping sheets that are simply flat. By increasing the number of pockets 85, more air/gas is trapped, thereby improving the insulating capability insulating sheets 56A.

In one embodiment, each recess 84 can have a volume that is in a range between 8 mm³ to 200 mm³ with between 10 mm³ to 100 mm³ and between 10 mm³ and 40 mm³ being more common. Other volumes can also be used. Furthermore, the number of recesses 84 is typically at least 10, 20, 40, 60, 80, 100 or 150 per square inch or is in a range between any two of the forgoing values, e.g., between 20 and 100 per square inch.

As depicted in FIG. 5A-5E, recesses 84 can be formed as separate discrete recesses that are spaced apart from each other and disposed in a uniform pattern. This formation and positioning of recesses 84 can result in stacked insulation sheets 56A having more uniform insulation properties and can help limit air movement between insulation sheets 56A. In other embodiments, however, recesses 84 can have multiple different sizes and shapes and can be uniformly or randomly spaced. For examples, recesses 84 can be formed by crinkling insulation sheets 56A. In other embodiments, recesses 84 can be formed by producing multiple folds on the insulation sheets 56A, such as accordion type folds, that produce recesses 84 in the form of elongated channels. However, such elongated channels may decrease the ability to restrain air movement between adjacent insulation sheets 56A.

In one embodiment all of insulation sheets 56A and the overlapping layers thereof can have recesses 84 formed thereon. In other embodiments, some insulation sheets 56A or overlapping layers thereof can have recesses 84 formed thereon while other insulation sheets 56A can simply be flat with no recesses 84. For example, ever other insulation sheet 56A or layer could be flat with no recesses 84 or just the outside top and bottom insulation sheets 56A or layers could be flat with no recesses 84. Furthermore, insulation sheets 56 and/or layers thereof can be orientated so that all of recesses 84 are facing in a single direction. For example, all of recesses 84 can be facing upward or downward. In other embodiments, insulation sheets 56 and/or layers thereof can be orientated so that some recesses 84 are facing upward while others are facing downward. For example, in the embodiment shown in FIG. 4B, recesses 84 in the bottom half of the layers may be facing upward while recesses in the top half of the layers are facing downward. Likewise, in FIG. 4A every other insulation sheet 56A can be inverted so that either recesses 84 of adjacent insulation sheets 56A are facing toward each other or recesses 84 of adjacent insulation sheets 56A are facing away from each other. Recesses 84 on adjacent insulation sheets 56A or layers can also be configured to be vertically aligned or vertically offset from each other.

Returning to FIG. 3, during assembly insulation sheets 56A are stacked and, if desired, folded, to achieve the desired number of overlying layers. The resulting stacked insulation sheets 56A are sized to have a width that is equal or substantially equal to the width of outside wall 58 and/or inside wall 60, i.e., the width of channel 54A, a length that is equal or substantially equal to the length of outside wall 58 and/or inside wall 60 i.e., the length of channel 54A, and a thickness that is equal or substantially equal to the height of channel 54A. As used in the specification and appended claims, the term "substantially" when used in association with a value for a length, area, or volume, is intended to mean equal to the value or within +/−10% of the value. The stacked insulation sheets 56A are placed on the inside face of outside wall 58 or inside wall 60 of blank 80. Blank 80 is then folded over insulation sheets 56A and secured in a continuous loop, as discussed above, so as to form sleeve 52A. In this configuration, insulation sheets 56A and pockets 85 bounded thereby occupy or substantially occupy the volume of channel 54. In one embodiment the resulting liner portion 50A has an insulation rating (R Value) of in a range between about 3.5/inch to about 4.5/inch measured at a mean temperature of 75° F.

Returning to FIG. 1, assembled liner portion 50A is shown folded into the U-shaped configuration. In this configuration, liner portion 50A can be defined as having a back with a first leg 92A and a second leg 94A orthogonally outwardly projecting from opposing ends of back 90A. An open channel 95A is bounded between legs 92A and 94A. As previously discussed, legs 92A and 94A can freely pivot relative to back 90A between being disposed in the same plane as back 90A, as shown in FIG. 2, and orthogonally projecting from back 90A, as shown in FIG. 1.

Liner portion 50B can have the same configuration with the same components, same method of formation and same alternatives as previously discussed with regard to liner portion 50A. As such, all of the disclosure herein regarding liner portion 50A and alternatives thereof is also applicable to liner portion 50B. Like elements between liner portion 50A and liner portion 50B are identified by like reference characters except that the reference characters for liner portion 50B include a suffix "B" rather than the suffix "A." The one difference between liner portions 50A and 50B is that, as discussed below in more detail, liner portion 50B is smaller than liner portion 50A so that liner portion 50B can fit within channel 95A of liner portion 50A.

Figure 7:
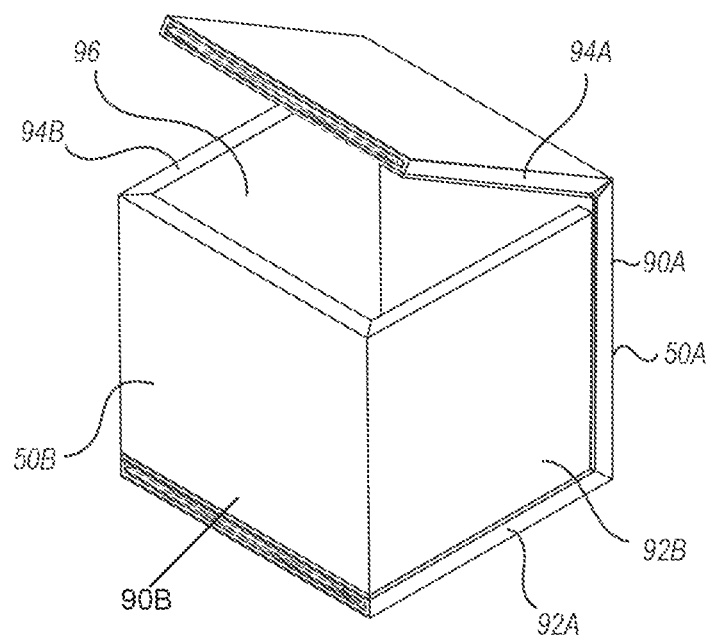
FIG. 7 is a perspective view of the assembled liner portions shown in FIG. 1.

With liner portions 50A and 50B produced, packaging system 10 is assembled by inserting liner portions 50A and 50B, i.e., liner 14A, into interior volume 22 of container 12 so that liner 14A bounds a compartment within interior volume 22. Although not required, in some embodiments liner 14A can directly sit against interior surface 20 of container 12. In still other embodiments, liner 14A can cover or substantially cover all of interior surface 20 of container 12. FIG. 7 shows how liner portions 50A and 50B are fit together when they are enclosed within container 12. Container 12 is not shown in FIG. 7 to better show the positioning of liner portions 50A and 50B. Liner portions 50A and 50B are fit together by liner portion 50B being rotated 90 degrees relative to liner portion 50A and being inserted within channel 95A of liner portion 50A. Liner portion 50B is fitted so that leg 92B of liner portion 50B abuts against the inside face of back 90A and vertically extends between the inside faces of legs 92A and 94A at a first side of liner portion 50A. Similarly, leg 94B of liner portion 50B abuts against the inside face of back 90A and vertically extends between the inside faces of legs 92A and 94A of liner portion 50A at an opposing second side of liner portion 50A. Back 90B of liner portion 50B extends between the inside face of leg 92A and leg 94A of liner portion 50A at the free ends of legs 92A and 94A. With liner portions 50A and 50B fitted together, they bound a compartment 96.

In one method of assembly, liner portion 50A and 50B can first be fitted together, as shown in FIG. 7, and then slid into interior volume 22 of container 12 (FIG. 1). More commonly, however, with reference to FIG. 8, liner portion 50A is first inserted into interior volume 22 of container 12 by positioning first leg 92A on top of bottom wall 28 and positioning back 90A against encircling sidewalls 24. In the depicted embodiment, back 90A is disposed against back wall 32 but in other embodiments, it could also be placed against any of walls 30, 34, or 36. In this embodiment, first leg 92A is sized to cover or substantially cover bottom wall 28 and back 90A is sized to cover or substantially cover back wall 32. In this configuration, second leg 94A can still freely pivot.

Figure 9:
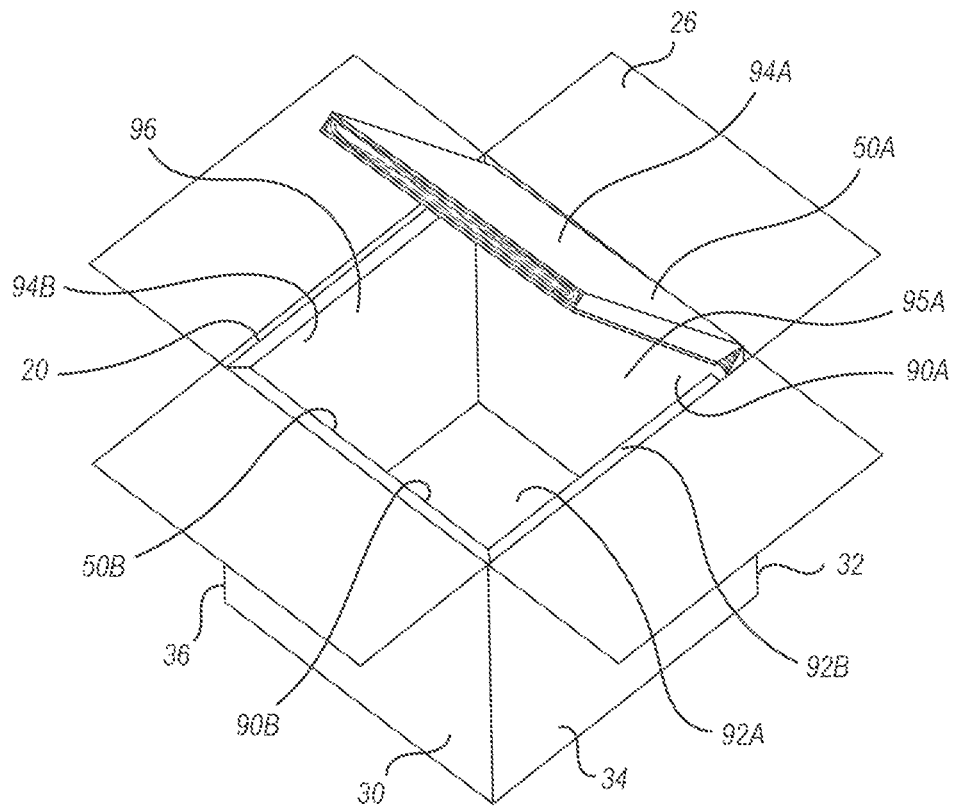
FIG. 9 is a perspective view of the assembly shown in FIG. 8 having the second liner portion received therein.

Next, as depicted in FIG. 9, liner portion 50B is fitted within channel 95A of liner portion 50A as previously discussed with regard to FIG. 7. In this position, liner portion 50B has the same position relative to liner portion 50A as previous discussed with regard to FIG. 7 and the combination bounds compartment 96. In addition, legs 92B and 94B can be disposed directly against the interior face of sidewalls 34 and 36, respectively, of container 12 and back 90B can be disposed directly against the interior surface of front wall 30. As previously noted, the combinations of liner portion 50A and liner portion 50B, i.e., liner 14A, can cover or substantially cover all of interior surface 20 of container 12 when container 12 is folded closed. In the assembled configuration, outside wall 58 of each sleeve 52 is disposed adjacent to container 12 while opposing inside wall 60 is disposed adjacent to compartment 96 configured to receive the item for shipping.

Figure 10:
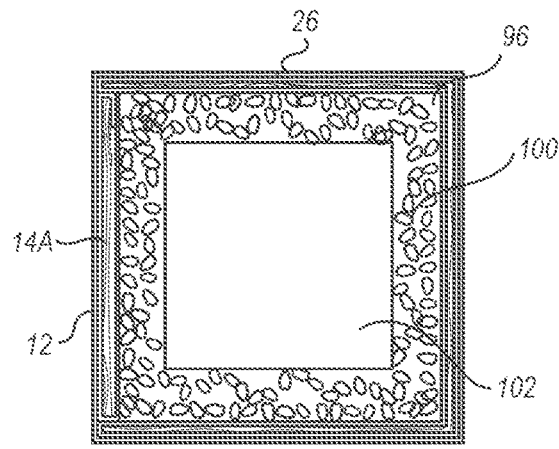
FIG. 10 is a cross sectional side view of the assembled packaging system shown in FIG. 1 housing a cold source and an item for shipping.
Figure 11:
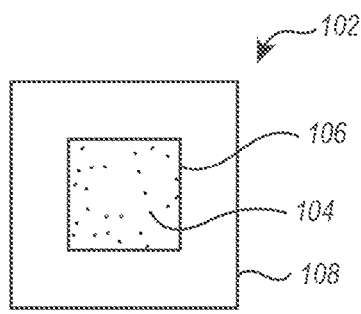
FIG. 11 is a schematic representation of the item for shipping including an inner container and an outer container.

With leg 94A still freely movable to access compartment 96, as shown in FIG. 9, a cold source 100 and an item for shipping 102, FIG. 10, are positioned within compartment 96. With reference to FIG. 11, the item for shipping 102 comprises a material 104 where it is desirable to maintain material 104 at a cooled temperature during the time that material 104 is being shipped. For example, material 104 could be biological materials, food products, beverages, pharmaceutical drugs, chemicals and other materials that need to be shipped cold to maintain their viability. Specific examples of biological materials include but are not limited to reagents, cell cultures, vaccines, cryopreserved cells, competent cells, proteins, enzymes, and antibodies. Although not always required, item for shipping 102 typically includes a container 106 that houses material 104. Examples of containers 106 include a syringe, bottle, bag, vial, box, carton, shell, canister, packaging, or the like. In other embodiments, item for shipping 102 can also comprise an outer container 108 which houses the container 106. Outer container 108 is not always required and can be eliminated. An example of when outer container 108 may be used is when it is desired to have a second container as a safety measure in case container 106 fails. Outer container 108 can also be used to securely hold a plurality of containers 106 to prevent unwanted movement or damage to containers 106. Examples of outer container 108 can also include a bag, box, carton, shell, canister, packaging, or the like.

Cold source 100 can comprise, dry ice, ice, frozen gel pack, and phase change materials that are commonly used for keeping materials cooled for relatively short durations. Dry ice is commonly used in pellet form, in slab form, or in other desired shapes and sizes. Cold source 100 can also comprise a separate container in which the dry ice, ice, frozen gel pack, and phase change materials are housed. Examples of such containers include bags, bottles, plastic containers, and the like.

It is appreciated that cold source 100 and item for shipping 102 can be disposed within compartment 96 in a variety of different methods and configurations. For example, with reference to FIG. 10, a quantity of cold source 100, such as pellets of dry ice, can first be disposed over the floor of compartment 96. Item for shipping 102 can then be centrally positioned on top of the cold source so that item for shipping 102 is spaced apart from liner 14A on all sides. Additional quantities of cold source 100, such as additional pellets of dry ice, can then be positioned to fill the remainder of compartment 96, i.e., cover all of the sides and top of item for shipping 102. Liner 14A can then be closed by folding leg 94A (FIG. 9) against the top liner portion 50B. Top wall 26 of container 12 can then also be closed, thereby placing packaging system in a condition for shipping, as shown in FIG. 10.

Depending on the duration and temperature that item for shipping 102 must be maintained cold, cold source 100 can also be applied in other ways. For example, cold source 100 may be applied only against the bottom of item for shipping 102, only against the top of item for shipping 102, or only against the top and bottom of item for shipping 102 but not against any of the sides thereof. In other embodiments, cold source 100 could be applied only against one or more of the sides of item for shipping 102 but not against the top or bottom of item for shipping 102. In yet other embodiments, cold source 100 could be applied only against one or more of the sides of item for shipping 102 and against one or both of the top or bottom of item for shipping 102. In one embodiment, item for shipping 102 can be frozen or chilled prior to placement within compartment 96 and can function as the cold source. That is, no additional cold source other than item for shipping 102 is positioned within compartment 96.

As previously noted, the size of container 12 is dependent upon the size of item for shipping 102 and the duration that item for shipping 102 needs to be kept cold. That is, as the size of item for shipping 102 increases and/or the time during increases for retaining item for shipping 102 cold increases, the size of container 12 increases. By increasing the size of container 106, the size of compartment 96 can also be increased, thereby making more space for additional quantities of cold source 100. Packaging system 10 is typically configured to hold compartment 96 or item for shipping 102 contained therein to a temperature of less than 11° C., 8° C., 2° C., or −10° C. for a period of time of at least 10 hours, 15 hours, 20 hours, 30 hours, 40 hours or 50 hours or for a range of time between any two of the foregoing values, e.g., between 10 and 40 hours.

Figure 12:
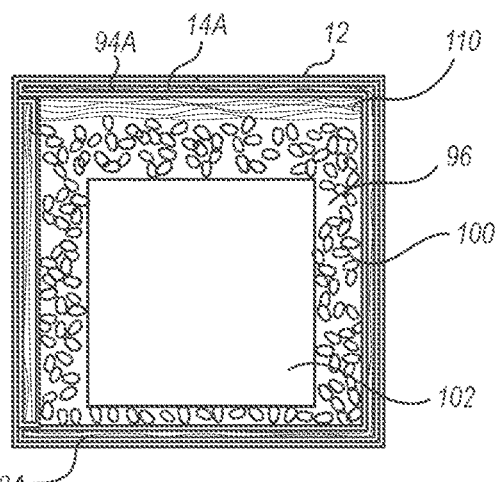
FIG. 12 is an alternative embodiment of the packaging system shown in FIG. 10 having a filler occupying a portion of the compartment therein.

In some embodiments, not all of the space required by compartment 96 may be needed. In this embodiment, a filler can be placed within compartment 96 to occupy the unneeded space. For example, depicted in FIG. 12, filler 110 is located within compartment 96 between cold source 100 and leg 94A of liner portion 50A. In one embodiment, filler 110 can comprise additional sheet of insulation sheets 56A. In other embodiments, filler 110 can comprise conventional dunnage, wadding stuffing, padding or other packaging material used to occupy space and is typically a recyclable, biodegradable and/or cellulose material.

Select embodiments of packaging system 10 can have a number of unique advantages. For example, in one embodiment, container 12 and liner 14 can be made exclusively of biodegradable and/or recyclable materials, thereby making packaging system more environmentally friendly. Thus, container 12 and liner 14 can be free of polymeric foam, such as expanded polystyrene, and non-biodegradable plastics.

Liner 14A described herein also achieves unique advantages for packaging system 10. For example, using sleeve 52 in combination with insulation sheets 56, as opposed to just using insulation sheets 56, achieves surprising and unexpected results. That is, while insulation sheets 56 help capture and retain pockets 85 of air so as to improve insulating capabilities, the use of sleeve 52 improves insulation beyond what would be expected based simply on the added thickness of material. For example, because sleeve 52 is made of a material that is stiffer and more resilient than insulation sheets 56, sleeve 52 helps prevent or limit the compression of insulation sheets 56 caused by cold source 100 and/or item for shipping 102. That is, without sleeve 52, cold source 100 and/or item for shipping 102 presses against insulation sheets 56 simply by their weight and/or as a result of the movement of packaging system 10 during transport. The compression of insulation sheets 56 compresses or removes air pocket 85, thereby decreasing the insulating capability. In contrast, limiting the compression of insulation sheets 56 helps to maximize and maintain air pockets 85 and thus improves insulating capabilities throughout the shipping process.

Furthermore, as dry ice evaporates it creates a gas. Where sleeve 52 is not used, the gas can more freely pass through insulations sheets 56 causing air within pockets 85 to flow, thereby decreasing insulating capabilities. In contrast, by surrounding insulation sheets 56 with sleeve 52, the gas is directed to flow out through cracks between liner portions 50A and 50B and less through insulation sheets 56, thereby again increasing insulating capabilities of liner 14A.

The use of sleeves 52 around insulation sheets 56 also achieve other benefits. For example, sleeves 52 have relatively rigid properties, both because they are made of a more rigid sheet than insulation sheets 56 and because they are formed into a tube-like structure which has improved mechanical strength relative to a flat sheet, e.g., a tube has greater strength to resist compression and has greater strength to resist buckling along its length than a flat sheet. As a result, placing liner 14 around the interior surface of container 12 significantly improves the structural strength of container 12 and thereby helps to prevent or limit damage to container 12 during shipping of item for shipping 102. Limiting damage to container 12 is useful since damage to container 12 can significantly decrease the insulating capabilities of packaging system 10 and thereby jeopardize the viability of item for shipping 102.

Figure 13:
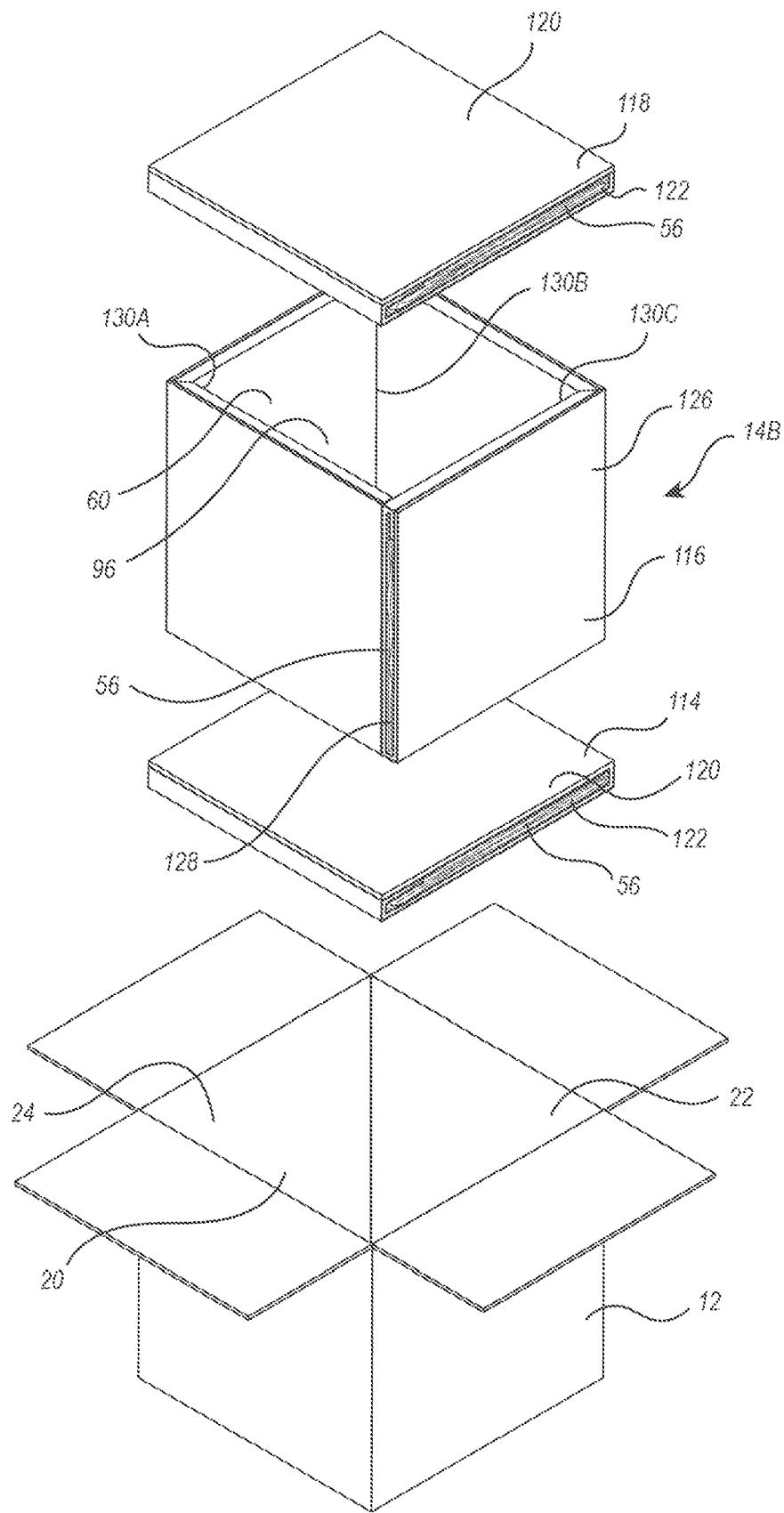
FIG. 13 is an exploded perspective view of an alternative embodiment of the liner shown in FIG. 1.

In alternative embodiments, it is appreciated that liner 14 can have a variety of different configurations. For example, depicted in FIG. 13 is an alternative configuration of a liner 14B that can be used in embodiments of the present disclosure. Like features between liners 14A and 14B are identified by like reference characters. Liner 14B is configured to be received within interior volume 22 of container 12 so as to bound compartment 96 therein. Again, compartment 96 is configured to house cold source 100 and item for shipping 102 therein, the same as discussed above with regard to liner 14A.

Liner 14B comprises a first liner portion 114, a second liner portion 116 and a third liner portion 118. First liner portion 114 comprises a sleeve 120 bounding a channel 122 extending therethrough. Disposed within channel 122 are insulation sheets 56 as previously discussed. Sleeve 120 can be made of the same materials, using the same methods and have the same alternatives as previously discussed with regard to sleeve 52A. The only difference is the sleeve 120 only comprises leg 92A of sleeve 52A (FIG. 1) and thus does not have slots or notches extending therethrough. First liner portion 114 is configured to sit on and cover or substantially cover the interior surface of bottom wall 28 of container 12.

Second liner portion 116 comprises a sleeve 126 bounding a channel 128 extending therethrough. Disposed within channel 128 are insulation sheets 56 as previously discussed. Sleeve 126 can be made of the same materials, using the same methods and have the same alternatives as previously discussed with regard to sleeve 52A (FIG. 2). The only difference is the sleeve 126 has three spaced apart slots 130A-130C that extend across and through inside wall 60 and which have corresponding notches at each opposing end. As a result of slots 130A-130C, sleeve 126 can be easily folded into a square or rectangular shape that encircles compartment 96. Second liner portion 116 is positioned within interior volume 22 of container 12 so as to sit on the top surface first liner portion 114. Second liner portion 116 can also directly contact and/or cover portions of interior surface 20 of encircling sidewall 24.

Finally, third liner portion 118 has the same configuration and can be made of the same materials using the same methods and alternative as first liner portion 114. As such, third liner portion 118 also includes sleeve 120 having channel 122 with insulation sheets 56 disposed therein. Third liner portion 118 is configured to sit on top of second liner portion 116 so as to cover compartment 96. Liner 14B can be used in the same way as liner 14A and has substantially all of the same benefits as discussed above with regard to liner 14A.

Figure 14:
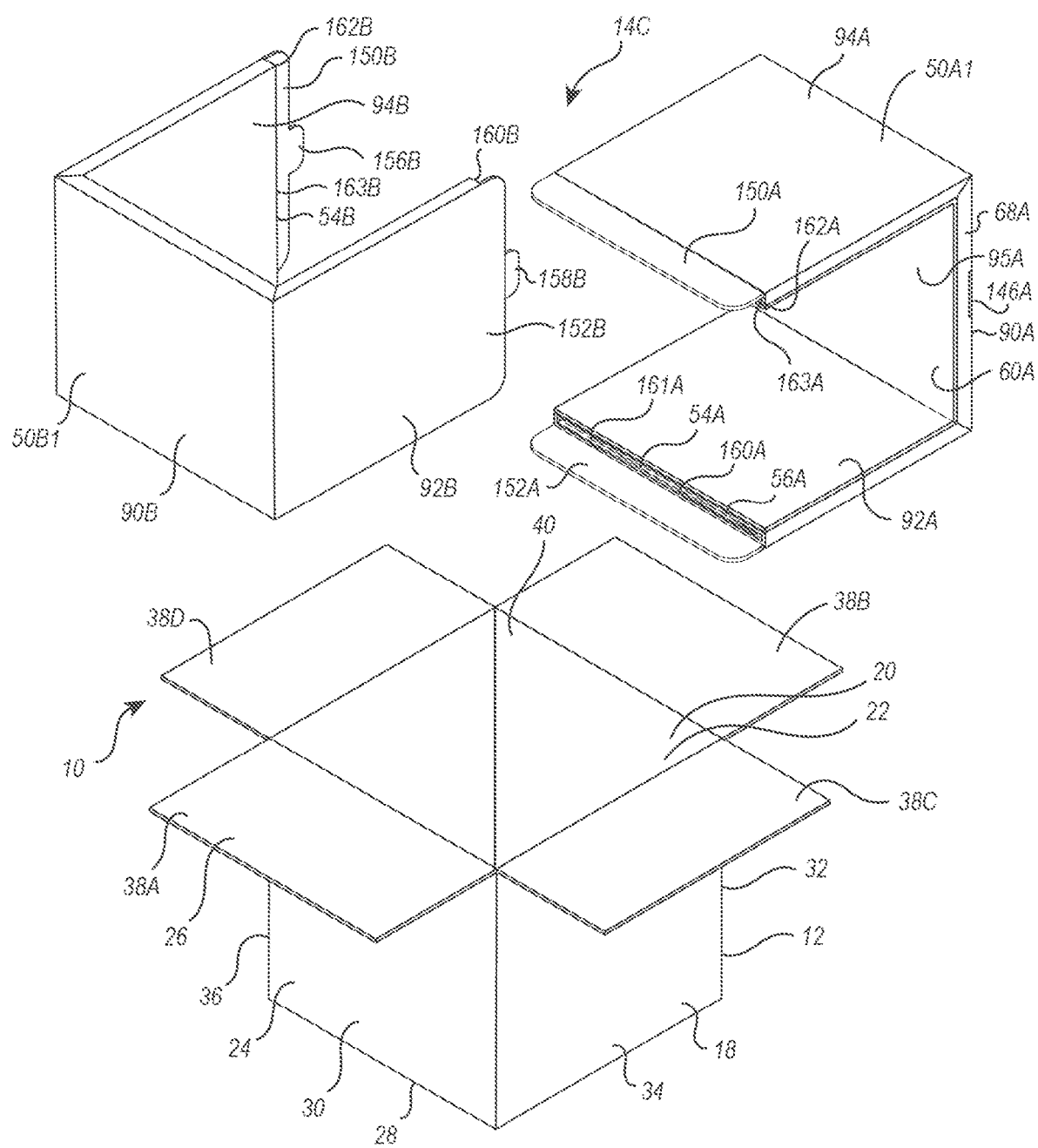
FIG. 14 is a partially exploded perspective view of an alternative embodiment of a packaging system using modified liner portions.

Depicted in FIG. 14 is another alternative configuration of a liner 14C that can be used in embodiments of the present disclosure. Like features between liners 14A and 14C are identified by like reference characters. Liner 14C is also configured to be received within interior volume 22 of container 12 so as to bound compartment 96 (FIG. 19) therein. Again, compartment 96 is configured to house cold source 100 and item for shipping 102 (FIG. 10) therein, the same as discussed above with regard to liner 14A.

Liner 14C comprises a first liner portion 50A1 and a second liner portion 50B1. Turing to FIG. 15, first liner portion 50A1 comprises a tubular sleeve 52A1 that encircles insulation sheets 56A. Insulation sheets 56A can comprise the same insulation sheets and alternatives as previously discussed. Like elements between tubular sleeve 52A and 52A1 are also identified by like reference characters. More specifically, tubular sleeve 52A1 includes substantially all of the elements of tubular sleeve 52A plus some additional tabs, flaps and slots. As discussed below in more detail, these tabs, flaps, and slots help, in part, to lock tubular sleeve 52A1 into a closed loop, close the opposing ends tubular sleeve 52A1, and interlock first liner portion 50A1 and second liner portion 50I.

Figure 16:
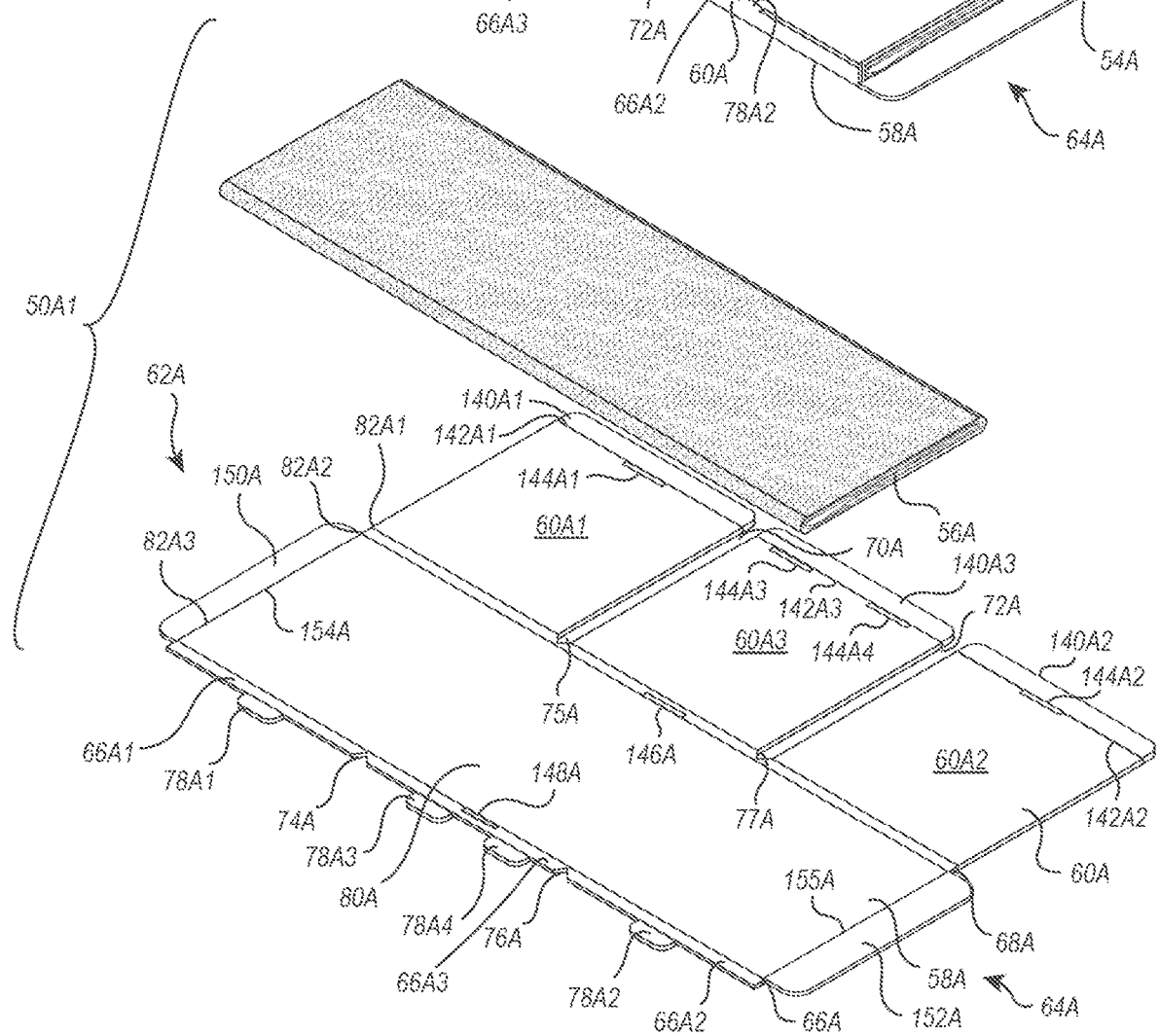
FIG. 16 is an exploded perspective view of the liner portion shown in FIG. 15.

As shown in FIG. 16, tubular sleeve 52A1 is initially formed as a flat blank 80A that includes outside wall 58A, inside wall 60A, and sidewalls 66A and 68A, as previously discussed. Like elements between blanks 80 and 80A are identified by like reference characters. Blank 80A can be made of the same materials and have the same dimensions, properties, and alternatives a previously discussed with regard to blank 80. Notches 74A and 76A divide first sidewall 66A into sidewall portion 66A1 disposed at first end 62A, sidewall portion 66A2 disposed at second end 64A, and sidewall portion 66A3 disposed therebetween. A tab 78A1 outwardly projects from an outside edge of sidewall portion 66A1 while a tab 78A2 outwardly projects from an outside edge of sidewall portion 66A2. Tabs 78A1 and 78A2 can be disposed centrally or otherwise along the corresponding sidewall portions. A pair of spaced apart tabs 78A3 and 78A4 outwardly project from an outside edge of sidewall portion 66A3. Tabs 78A are typically formed as a single, integral structure with the remainder of blank 80A and thus are also typically formed of a cellulose material.

Similarly, slots 70A and 72A, previously discussed, divide inside wall 60A into inside wall portion 60A1 disposed at first end 62A, inside wall portion 60A2 disposed at second end 64A, and inside wall portion 60A3 disposed therebetween. A flap 140A1 projects from and extends along the outside edge of inside wall portion 60A1 with a fold line 142A1 being formed at the intersection between flap 140A1 and inside wall portion 60A1. Flap 140A1 typically has a height that is substantially equal to the height of sidewall portion 66A1 but can be shorter. A slot 144A1 extends through blank 80A at or adjacent to fold line 142A1 and is configured to receive tab 78A1 during assembly for locking inside wall portion 60A1 and outside wall 58A in a secured joint that results in a continuous loop. Slot 144A1 can be formed on flap 140A1 and/or inside wall portion 60A1.

A flap 140A2 projects from and extends along the outside edge of inside wall portion with a fold line 142A2 being formed at the intersection between flap 140A2 and inside wall portion 60A2. Flap 140A2 typically has a height that is substantially equal to the height of sidewall portion 66A2 but can be shorter. A slot 144A2 extends through blank 80A at or adjacent to fold line 142A2 and is configured to receive tab 78A2 during assembly for locking inside wall portion 60A2 and outside wall 58A in a secured joint that results in a continuous loop. Slot 144A2 can be formed on flap 140A2 and/or inside wall portion 60A2.

A flap 140A3 projects from and extends along the outside edge of inside wall portion with a fold line 142A3 being formed at the intersection between flap 140A3 and inside wall portion 60A3. Flap 140A3 typically has a height that is substantially equal to the height of sidewall portion 66A3 but can be shorter. A pair of spaced apart slot 144A3 and 144A4 extend through blank 80A at or adjacent to fold line 142A3 and are configured to receive tabs 78A3 and 78A4, respectively, during assembly for locking inside wall portion 60A3 and outside wall 58A in a secured joint that results in a continuous loop. Slot 144A3 and 144A4 can be formed on flap 140A3 and/or inside wall portion 60A3. Flaps 140A are typically formed as a single, integral structure with the remainder of blank 80A and thus are also typically formed of a cellulose material.

As will be discussed below in greater detail, blank 80A/tubular sleeve 52A1 also includes a locking slot 146A that passes through blank 80A at or adjacent to fold line 82A at a location between outside wall 58A and inside wall portion 60A3. Locking slot 146A is typically disposed at a central location between slots 70A and 72A and can extend through sidewall 68A and/or outside wall 58A. A locking slot 148A also passes through blank 80A at or adjacent to fold line 82A3 at a location between outside wall 58A and sidewall portion 66A3. In one embodiment, locking slot 148A is centrally disposed between notches 74A and 76A and can extend through sidewall 66A and/or outside wall 58A. Finally, a cover flap 150A outwardly extends from and along the edge of outside wall 58A at first end 62A while a cover flap 152A outwardly extends from and along the edge of outside wall 58A at second end 64A. A fold line 154A is typically formed at the intersection between cover flap 150A and outside wall 58A while a fold line 155A is typically formed at the intersection between cover flap 152A and outside wall 58A.

Figure 15:
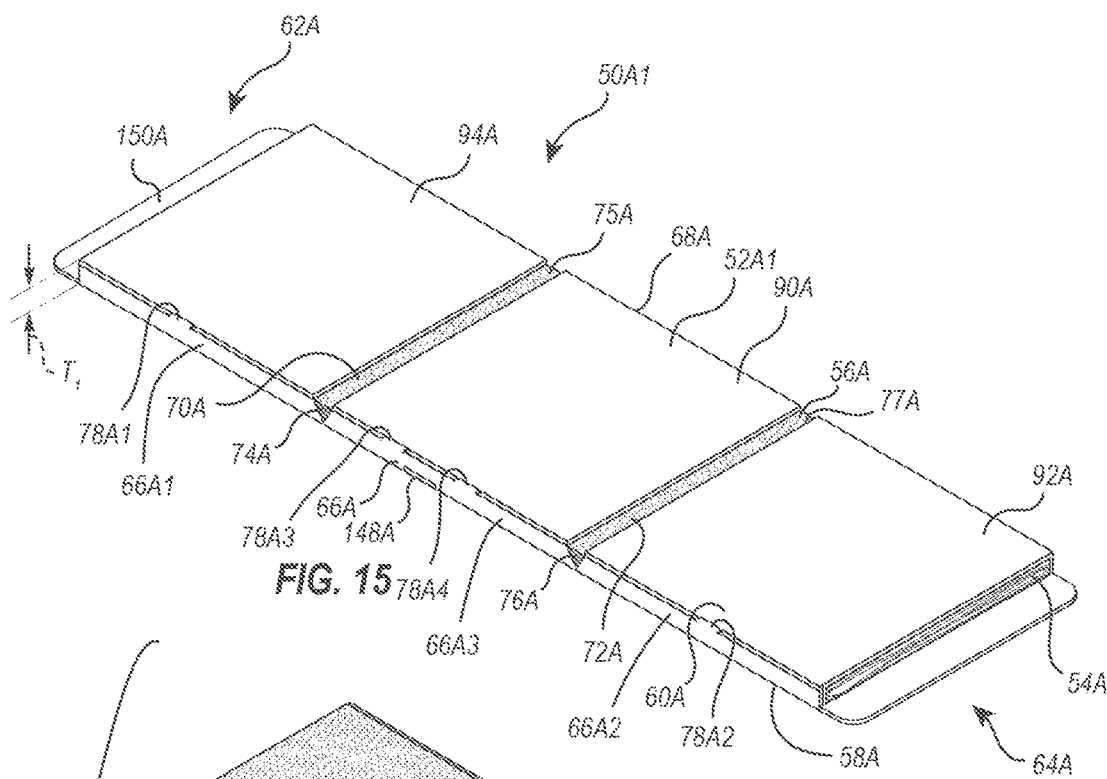
FIG. 15 is a perspective view of one of the liner portions shown in FIG. 14 laid flat.

During assembly, insulation sheets 56A, as previously discussed, are positioned on blank 80A and inside wall portions 60A1, 60A2, and 60A3 are folded over so that insulations sheets 56A are captured between the inside wall portions 60A and outside wall 58A, as shown in FIG. 15. Flaps 140A1, 140A2 and 140A3 are folded down toward insulation sheets 56A while sidewall portions 66A1, 66A2 and 66A3 are folded upward against the outside face of flaps 140A1, 140A2 and 140A3, respectively. Finally, tabs 78A1, 78A2, 78A3 and 78A4 are slid into slots 144A1, 144A2, 144A3, and 144A4, respectively, so as to mechanically secure blank 80A into a continuous loop. Tabs 78A and slots 144A thereby enable forming blank 80A into tubular sleeve 52A1 and liner portion 50A1 without the need for a separate attachment mechanism, such as tape or adhesive. Eliminating the need for an adhesive can be especially beneficial in that it avoids the complexity and complications commonly associated with using an adhesive and also avoids production delays needed for curing the adhesive.

Figure 17:
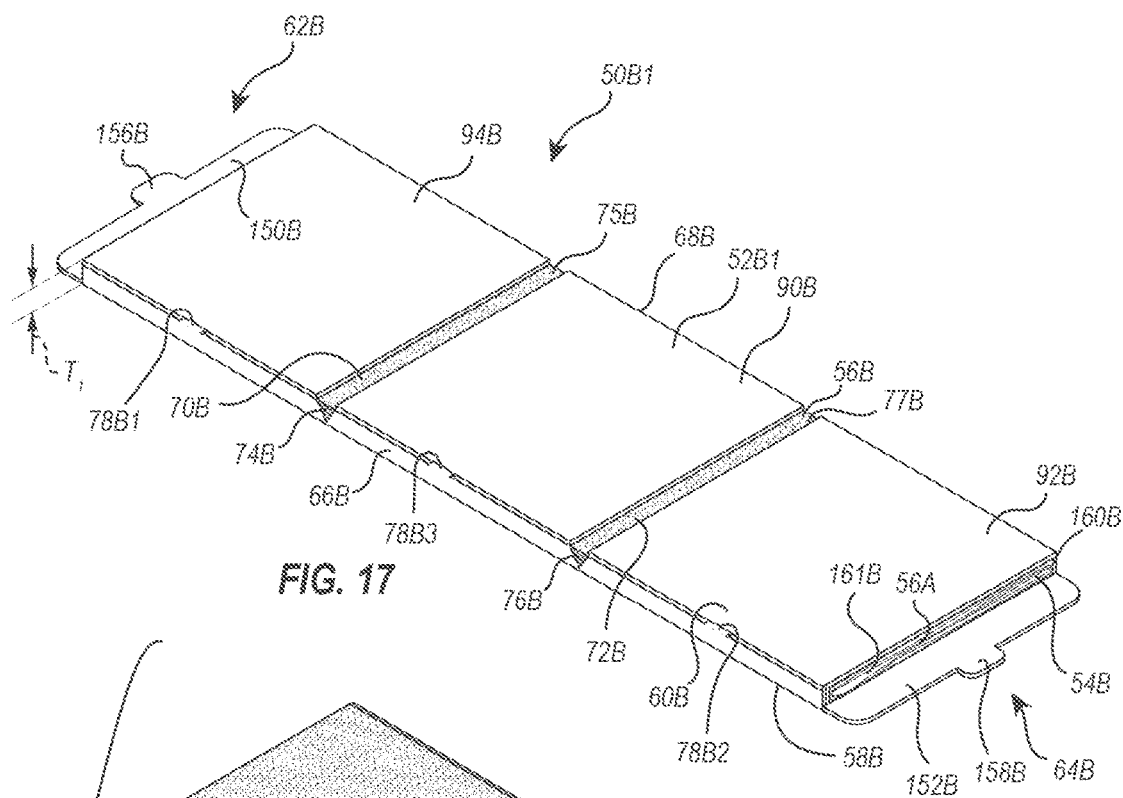
FIG. 17 is a perspective view of the other of the liner portions shown in FIG. 14 laid flat.
Figure 18:
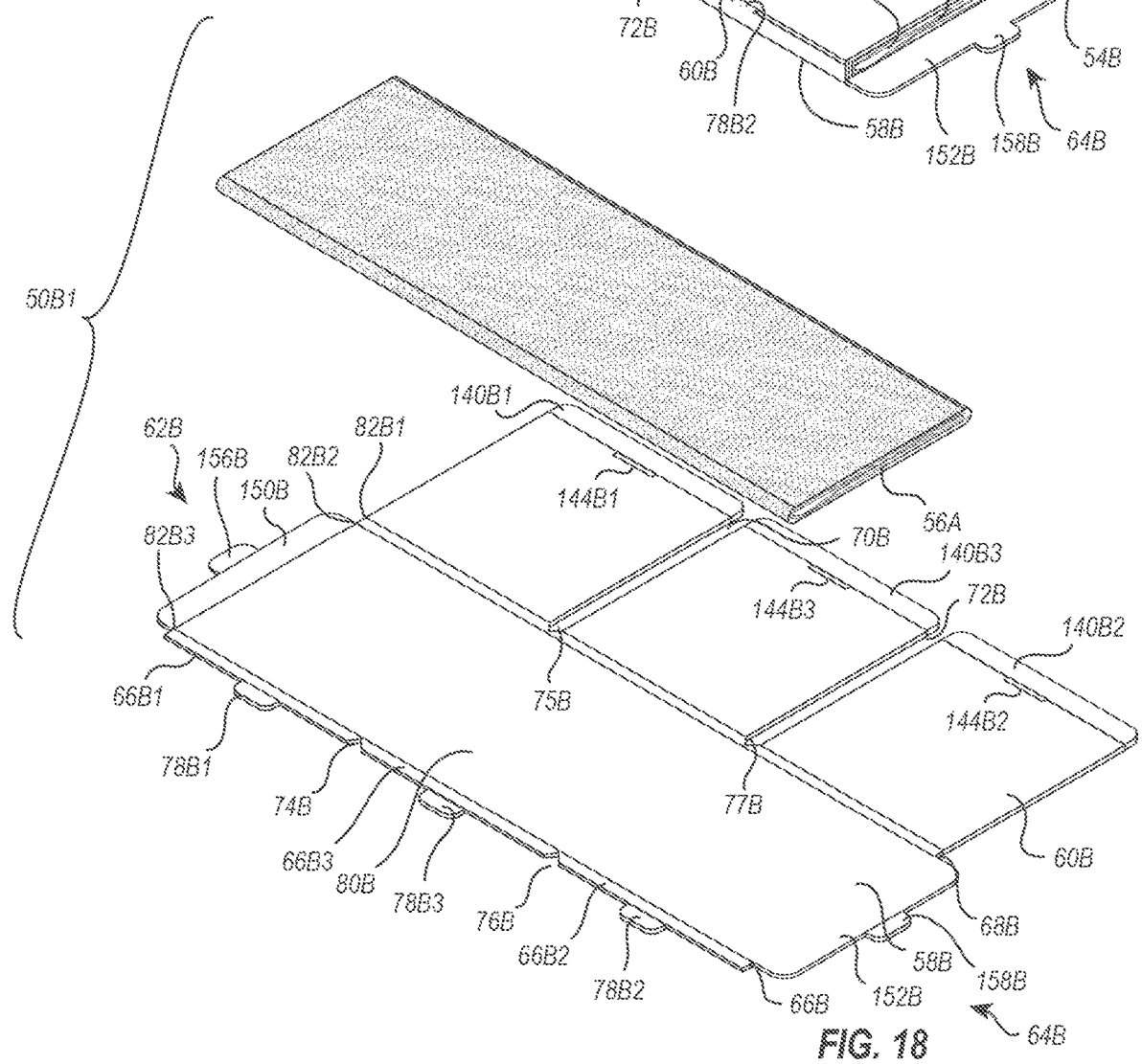
FIG. 18 is an exploded perspective view of the liner portion shown in FIG. 17.

Turing to FIG. 17, second liner portion 50I comprises a tubular sleeve 52B1 that encircles insulation sheets 56A. Like elements between tubular sleeves 52A1 and 52B1 are identified by like reference characters except that the letter "A" used to identify the element in tubular sleeve 52A1 has been replaced with the letter "B". As shown in FIG. 18 tubular sleeve 52B1 is formed from a flat blank 80B. Again, flat blank 80B can be made from the same materials and alternatives as previously discussed with blank 80. Blanks 80A and 80B are substantially identical and like elements are identified by like reference characters. Blank 80B is different from blank 80A in that tab 78A4 and slot 144A4 have been eliminated from blank while tab 78A3 and slot 144A3 have been centered. It is noted, however, that each of sidewall portions 66A1, 66A2 and 66A3 and/or sidewall portions 66B1, 66B2 and 66B3 can have one, two three or more separate tabs projecting therefrom with corresponding slots for interlocking the blanks in a continuous loop. The locations of the tabs and slots can also be reversed.

Blank 80B also differs from blank 80A in that locking slots 146A and 148A have been eliminated. However, added to blank 80B is a locking tab 156B that outwardly projects from an outside edge of cover flap 150B at first end 62B and a locking tab 158B that outwardly projects from an outside edge of cover flap 152B at second end 64B. As discussed below, locking tabs 156B and 158B are configured to be received within locking slots 146A and 146B (FIG. 16) on tubular sleeve 52A1. Finally, as previously discussed with regard to tubular sleeves 52A and 52B, tubular sleeve 52B1 is smaller than tubular sleeve 52A1 so that tubular sleeve 52B 1 can fit within a channel formed by tubular sleeve 52A1, as discussed below. As shown in FIG. 17, blank 80B is secured into a continuous loop encircling insulation sheets 56A, i.e., is formed into tubular sleeve 52B1 and liner portion 50B 1, in the same manner as discussed above with regard to blank 80A.

Returning to FIG. 14, assembled liner portion 50A1 and 50B1 are shown folded into the U-shaped configuration previously discussed with regard to liner portions 50A and 50B. In this configuration, each of liner portions 50 can be defined as having a back 90 with a first leg 92 and a second leg 94 orthogonally outwardly projecting from opposing ends of back 90. An open channel 95 is bounded between legs 92 and 94. As previously discussed, legs 92 and 94 can freely pivot relative to back 90 between being disposed in the same plane as back and orthogonally projecting from back 90. Leg 92A of liner portion 50A1 terminates at an end face 160A that encircles an opening 161A that communicates with channel 54A in which insulation sheets 56A are disposed. Cover flap 152A outwardly projects from end face 160A. Likewise, leg 94A of liner portion 50A1 terminates at an end face 162A that encircles an opening 163A that communicates with channel 54A in which insulation sheets 56A are disposed. Cover flap 150A outwardly projecting from end face 162A. Back 90 has locking slot 146A and 148A from on the opposing sides thereof.

Similar to the above, leg 92B of liner portion 50B1 terminates at an end face 160B that encircles an opening 161B that communicates with channel 54B in which insulation sheets 56A are disposed (FIG. 17). Cover flap 152B and locking tab 158B outwardly project from end face 160B. Likewise, leg 94B of liner portion 50B1 terminates at an end face 162B that encircles an opening 163B that communicates with channel 54B in which insulation sheets 56A are disposed. Flap 150B and locking tab 156B outwardly projecting from end face 162B.

Figure 19:
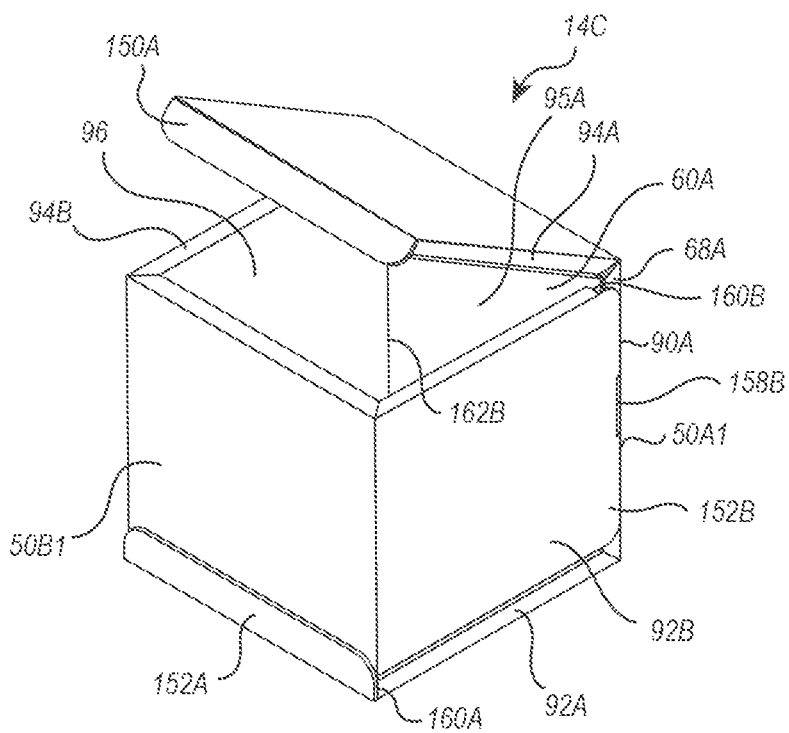
FIG. 19 is a perspective view of the two liner portions shown in FIG. 14 coupled together.

With liner portions 50A1 and 50B1 produced, packaging system 10 is assembled by inserting liner portions 50A1 and 50B1, i.e., liner 14C, into interior volume 22 of container 12 so that liner 14C bounds a compartment within interior volume 22. Although not required, in some embodiments, liner 14C can directly sit against interior surface 20 of container 12. In still other embodiments, liner 14C can cover or substantially cover all of interior surface 20 of container 12. FIG. 19 shows how liner portions 50A1 and 50B1 are fit together prior to or after being positioned within container 12. Liner portions 50A1 and 50B1 are fit together by liner portion 50B1 being rotated 90 degrees relative to liner portion 50A1 and being inserted within channel 95A of liner portion 50A1. Liner portion 50B1 is fitted so that end face 160B of leg 92B of liner portion 50B1 abuts against the inside face, i.e., inside wall 60A, of back and cover flap 152B is disposed against sidewall 68A of back 90A. Similarly, end face 162B of leg 94B of liner portion 50B1 abuts against the inside face, i.e., inside wall 60A, of back 90A and cover flap 152B is disposed against sidewall 66A of back 90A. In this position, locking tab1 156B and 158B are folded over and inserted into locking slots 148A and 146B, respectively, thereby coupling liner portions 50A1 and 50B1 together using a mechanical attachment. With liner portions 50A1 and 50B1 so fitted together, they form liner 14C bounding compartment 96.

Figure 20:
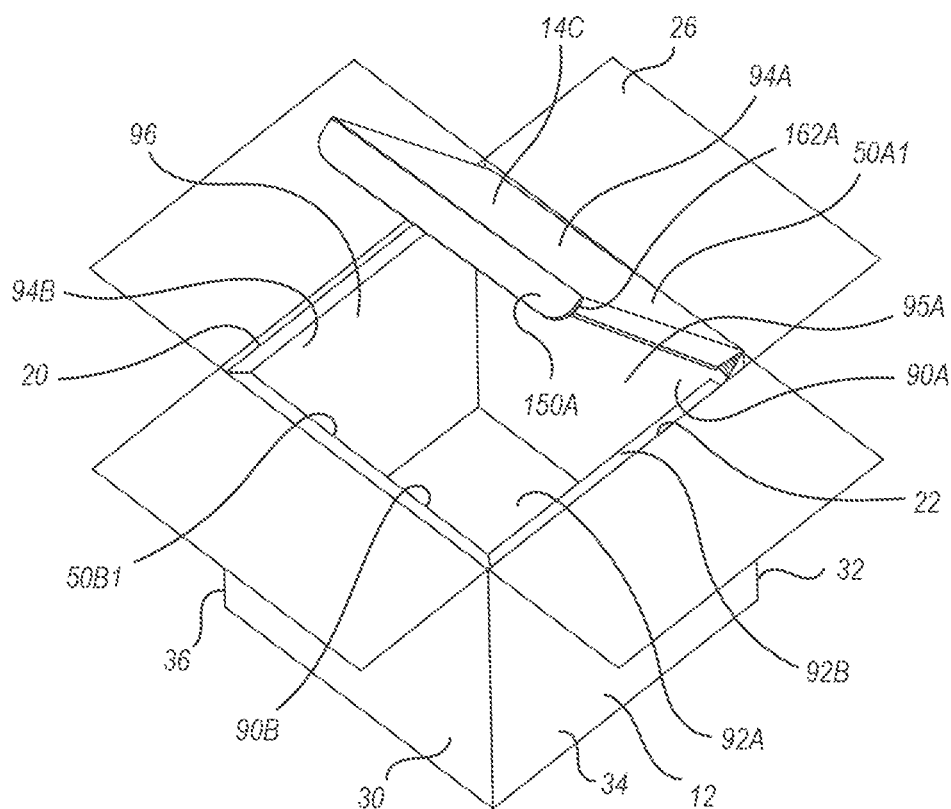
FIG. 20 is a perspective view of the coupled liner portions shown in FIG. 19 disposed within the container of FIG. 14.

During further assembly, as depicted in FIGS. 19 and 20, coupled liner portions 50A1 and 50B1, i.e., liner 14C, are lowered into interior volume 22 of container 12. In so doing, cover flap 152A is folded upward so as to cover end face 160A and opening 161A (FIG. 14) of liner portion 50A1. Cover flap 152A is held against end face 160A by container 12. Next, as previously discussed with regard to liner 14A, a cold source 100 and item for shipping 102 (FIG. 10) are disposed within compartment 96. Cold source 100 and item for shipping 102 along with their alternatives and methods for placement, as previously discussed with regard to liner 14A, are also applicable for use with liner 14C. Once cold source 100 and item for shipping 102 have been positioned within compartment 96, leg 94A of liner portion 50A1 is folded over to into container 12 so as to close compartment 96. Before or during the folding of leg 94A, cover flap 150A is folded over so as to cover end face 162A and opening 163A of liner portion 50A1. In one embedment, cover flap 150A can have a height that is sufficient to project beyond end face 162A. In this case, the freely projecting portion of cover flap 150A can be slid between back 90B of liner portion 50B1 and container 12. The close tolerance fit between liner 14C and container 12 holds cover flap 150A against end face 162A of liner portion 50A1.

Liner 14C has a number of unique benefits and advantages. For example, using the integral tabs and slots to mechanically secure blanks 80A and 80B into tubular sleeves eliminates the need for separate attachment mechanisms, such as tape or adhesive, which can complicate and delay the assembly process. Furthermore, the mechanical closing of blanks 80A and 80B achieves a tight closure around insulation sheets 56 which decreases gas flow there through and improves thermal efficiency. In addition, by using locking tabs 156B and 158B with corresponding locking slots to securely couple liner portions 50A1 and 50B1 together, there is less leaking of gas or the formation of non-insulated gaps between liner portions 50A1 and 50B1. The use of locking tabs and locking slots is especially helpful where outer container 12 is larger than liner 14C. In this case, a liner may move within container 12 during shipping or movement which can produce gaps between the liner portions. Mechanically securing the liner portions together helps to prevent the formation of such gaps during movement of the liner which helps to maximize thermal efficiency.

Furthermore, cover flaps 150A and 152A cover the terminal end faces and openings of liner portion 50A1 where insulation sheets 56A are freely exposed. This covering of the terminal end faces of liner portion 50A1 thereby helps to limit gas flow through insulation sheets 56A and thereby improves thermal efficiency. Cover flaps 150B and 152B on liner portion 501 also help to block air flow into or out of the terminal end faces of liner portion 501, thereby also improving thermal efficiency. Other advantages also exist.

Figure 21:
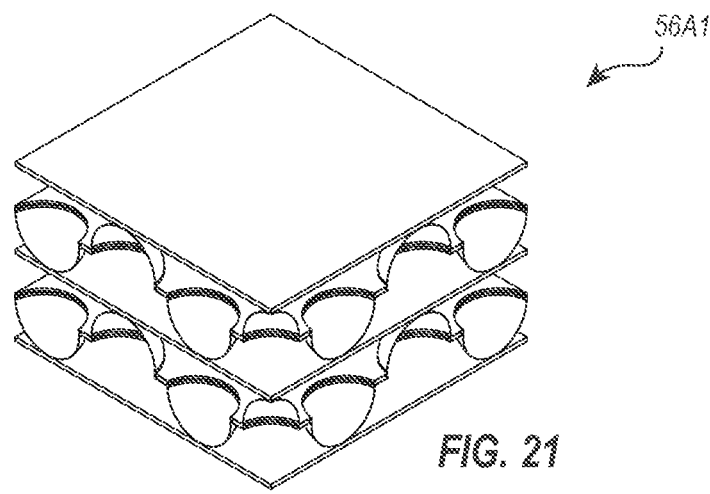
FIG. 21 is a perspective view of modified insulation sheets for use in the liners.
Figure 22:
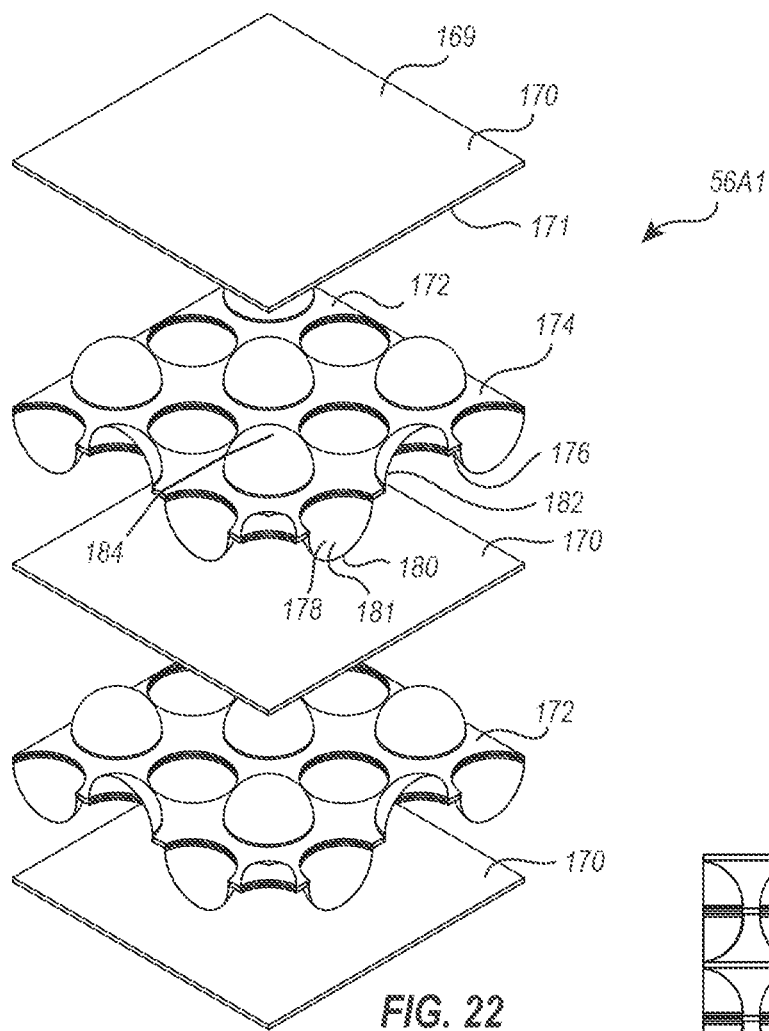
FIG. 22 is an exploded view of the insulation sheets shown in FIG. 21.
Figure 23:
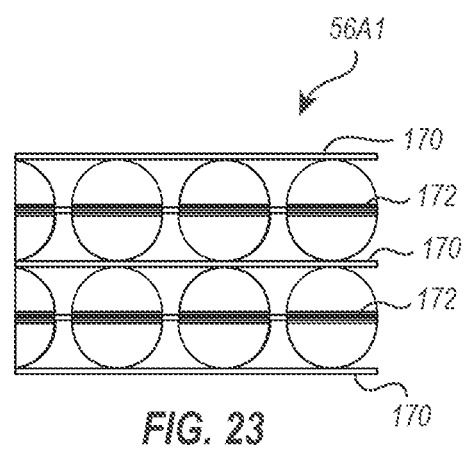
FIG. 23 is an elevated side view of the insulation sheets shown in FIG. 21.

It is also appreciated that insulation sheets disclosed herein can also have other configurations. For example, depicted in FIGS. 21-23 is an alternative embodiment of insulation sheets 56A1. In this embodiment, insulation sheets 56A1 comprise alternating layers of flat sheets 170 and embossed sheets 172. Each flat sheet 170 has a top surface 169 and an opposing bottom surface 171 that are typically flat. That is flat sheets 170 are typically formed as flat, planar sheets that have no embossing formed thereon. Each embossed sheet 172 has a top surface 174 and an opposing bottom surface 176, and plurality of spaced apart first embossings 178. First embossing 178 project out of bottom surface 176 and terminate at a terminal end 180. Each first embossing 178 bounds a recess 181 that is openly exposed from top surface 174. Each embossed sheet 172 also includes a plurality of second embossings 182 that outwardly project from top surface 174 and terminate at a terminal end 184. Each second embossing 182 bounds a recess 186 that is openly exposed from bottom surface 176.

Although embossings 178 and 182 are depicted in the figures as having a semi-spherical configuration, recesses 181 and 186 of embossings 178 and 182 can have the same configuration, size, concentration, and other properties as previously discussed with regard to the recesses of insulation sheets 56A. Likewise, flat sheets 170 and embossing sheets 172 can be made of the same materials and have the same dimensions and other properties as previously discussed with regard to the sheets of insulation sheets 56A.

However, in contrast to insulation sheets 56A, the separate sheets in insulation sheets 56A1 are secured together by an adhesive. Specifically, using conventional methods known in the formation of corrugated cardboard, an adhesive is applied to terminal ends 180 and 184 of embossings 178 and 182. For example, one or more rollers can be used to apply the adhesive to terminal ends 180 and 184 of embossings 178 and 182. Flat sheets 170 are then applied against terminal ends 180 and 184 so that flat sheets 170 are secured to the opposing sides of embossing sheets 172. Any desired number of alternating layers of flat sheets and embossed sheets can be used. For example, the total number of vertically stacked sheets that are secured together by adhesive can typically be at least or less than 3, 5, 10, 15, 20, 25, or 30 sheets or in a range between any two of the foregoing values. In addition, the formed insulation sheets 56A1 can be folded over once or twice, such as previously discussed with regard to FIGS. 4B and 4C. In this case, a desired number of sheets may be stacked but not all of the adjacent sheets may be secured together by an adhesive.

Insulation sheets 56A1 can replace all uses of insulation sheets 56A disclosed herein and have a number of unique benefits. For example, as a result of securing embossed sheets 172 to flat sheets 170 by adhesive, small, isolated cavities (which at least in part include recesses 181 and 186) are formed between the sheets in which air pockets are produced. Thus, the cavities help to improve thermal efficiency by forming and maintaining isolated air pockets. More specifically, the structure of insulation sheets 56A1 has to limit the flow of air through recesses 181 and 186. Furthermore, as a result of securing the sheets together by adhesive, the stack sheets of insulation sheets 56A1 have greater rigidity relative to insulation sheets 56A. As a result of the increased rigidity of insulation sheets 56A1, there is less probability that the cavities or pockets between the sheets will be compressed or otherwise disrupted during shipment or moving of a container assembly, thereby also maximizing thermal efficiency. In addition, because insulation sheets 56A1 have a higher thermal efficiency, thinner insulation sheets 56A1 can be used relative to insulation sheets 56A to achieve the same insulation factor. By using thinner insulation sheets 56A1, the weight and/or size of the final shipping assembly is decreased, thereby decreasing shipping costs. In addition, the increased rigidity of the insulation sheets 56A1 helps to improve the rigidity of the overall liner in which it is used, thereby improving the stability of the overall assembly. Other benefits and advantages also exist.

Figure 24:
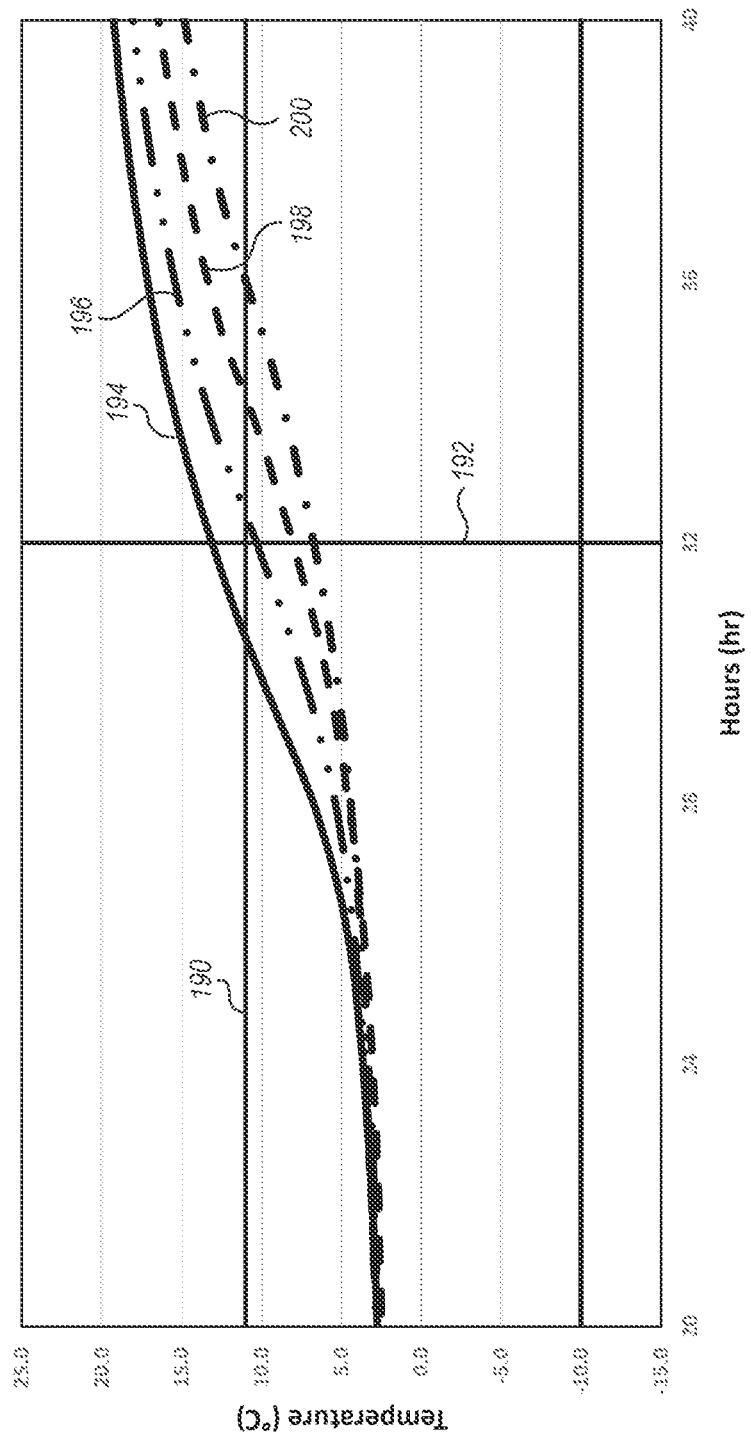
FIG. 24 is a graph comparing the testing of four different packaging system.

Depicted in FIG. 24 is a graph that plots temperature versus time for a 500 ml bottle of water disposed within four different insulated packaging systems of the present disclosure. The water is cooled by two 16 ounce standard frozen gel packs. As identified by lines 190 and 192, the typical standard is to maintain the item for shipping at a temperature below 11° C. for a period of 32 hours while the insulated packaging system is being subjected to normal environmental conditions. For the graph shown in FIG. 24, the four different insulated packaging systems were each subjected to International Safe Transit Association (ISTA) 7E summer ambient conditions during the testing.

Line 194 of the graph plots temperature versus time of a first insulated packaging system that incorporates liner 14A disclosed herein that is sealed within a cardboard box. As shown by the graph, this initial system was only able to maintain the temperature of the water below 11° C. for a period of about 31 hours.

Line 196 of the graph plots temperature versus time of a second insulated packaging system that holds all variables of the first insulated packaging system constant except that the liner portions 50A and 50B of liner 14A (shown in FIG. 1) were replaced with liner portions 50A1 and 50A2 (shown in FIGS. 14-18). The graph shows that by using liner portions 50A1 and 50A2 which improve trapping of the gas within the liner portions and which secure the liner portions together, the thermal efficiency of the system is improved enabling the temperature of the water to be maintained at below 11° C. for a period of time slightly longer than 32 hours.

Line 198 of the graph plots temperature versus time of a third insulated packaging system that holds all variables of the second insulated packaging system constant except that the material used to form liner portions 50A1 and 50A2 is changed. Specifically, in the above second packaging system, liner portions 50A1 and 50A2 were formed using a standard 32 ECT (Edge Crush Test) corrugated cardboard while in the third packaging system, liner portions and 50A2 were formed using a 200 lb bust strength corrugated cardboard. 32 ECT cardboard can commonly be made from relatively light and recycled paper. In contrast, 200 lb bust strength cardboard is denser and typically needs to be made from virgin material. Line 198 of the graph shows that the third insulated packaging system was able to maintain the temperature of the water at below 11° C. for a period of time of about 34 hours. Thus, making liner portions 50A1 and 50A2 from denser and stronger cardboard further improves the thermal efficiency of the packaging system.

Finally, line 200 of the graph plots temperature versus time of a fourth insulated packaging system that holds all variables of the above second insulated packaging system constant except that the insulation sheets 56A are replaced with insulation sheets 56A1. It is noted that the total thickness of insulation sheets 56A1 used in the fourth insulated packaging system was thinner than the total thickness of insulation sheets 56A used in the second insulated packaging system. Line 200 of the graph shows that the fourth insulated packaging system was able to maintain the temperature of the water at below 11° C. for a period of time of about 36 hours. Thus, the graph shows that the packaging system has a significant improvement in thermal efficiency by using the glued insulation sheets 56A1 relative to the merely stacked insulation sheets 56A.

Figure 25:
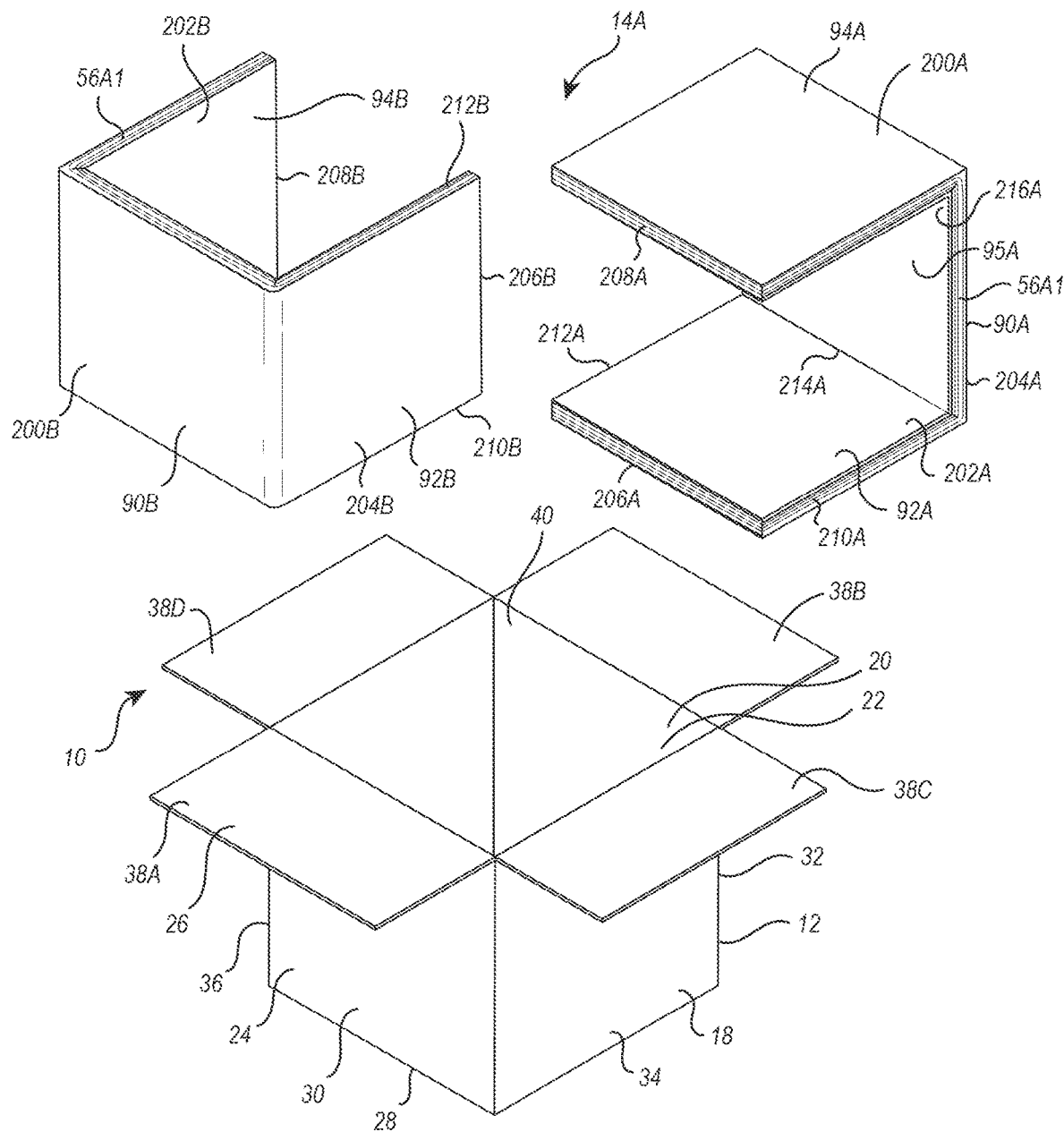
FIG. 25 is a partially exploded perspective view of an alternative embodiment of a packaging system that uses the insulation sheets of FIG. 21 without sleeves.

Because of the relative stiffness of insulation sheets 56A1, in some applications insulation sheets 56A1 can be used as liners without a tubular sleeve encircling insulation sheets 56A1. For example, depicted in FIG. 25 is another alternative configuration of a liner 14D that can be used in embodiments of the present disclosure. Like features between liners 14A and 14D are identified by like reference characters. Liner 14D is also configured to be received within interior volume 22 of container 12 so as to bound compartment 96 (FIG. 26) therein. Again, compartment 96 is configured to house cold source 100 and item for shipping 102 (FIG. 10) therein, the same as discussed above with regard to liner 14A.

Liner 14D comprises a first liner portion 200A and a second liner portion 200B. First liner portion 200A comprises insulation sheets 56A1 wherein the individual sheets thereof have been secured together by an adhesive as previously discussed with regard to FIGS. 21-23. First liner portion 200A does not include a separate sleeve or sheet, such as tubular sleeve 52A or 52A1, that encircles insulation sheets 56A1. Rather, insulation sheets 56A1 forming first liner portion 200A are configured to sit directly against container 12 and directly bound compartment 96 in which the item for shipped 102 is disposed.

Insulation sheets 56A1 are cut or otherwise formed so that first liner portion 200A can properly fit within volume 22 of container 12, the same as previously discussed with regard to liner 14A and first liner portion 50A. More, specifically, first liner portion 200A has an interior surface 202A and an exterior surface 204A having a rectangular configuration that longitudinally extends between opposing end faces 206A and 208A and that laterally extend between opposing side faces 210A and 212A. As depicted, first liner portion 200A can be selectively folded into a U-shaped configuration. When in the U-shaped configuration, first liner portion 200A can be defined as having a back 90A with a first leg 92A and a second leg 94A orthogonally outwardly projecting from opposing ends of back 90A. An open channel is bounded between legs 92A and 94A. Legs 92A and 94A can freely pivot relative to back 90A between being disposed in the same plane as back 90A and orthogonally projecting from back 90A, as shown in FIG. 25.

To facilitate folding of first liner portion 200A into the U-shaped configuration, cut lines 214A and 216A can be formed on interior surface 202A and linearly extend between opposing side faces 210 and 212 at the points of folding. In one embodiment, cut lines 214A and 216A can comprise linear cuts that only pass part way through liner portion 200A. Such cuts both form a living hinge and maintain an uncut thickness of liner portion 200A so to help maintain the thermal effectiveness. In other embodiments, cut lines 214A and 216A can comprise V-shaped notches that are cut or otherwise formed along interior surface 202A at the points of folding.

Second liner portion 200B is also formed from insulation sheets 56A1 and has the same configuration, elements, and properties as discussed above with regard to first liner portion 200A. As such, like elements liner portions 200A and 200B are identified by like reference characters except that the reference characters of second liner portion 200B incorporate the letter "B" rather than the letter "A". However, as discussed below in further detail, second liner portion 200B is smaller than first liner portion 200A so that second liner portion 200B can fit within channel 95A of first liner portion 200A.

Figure 26:
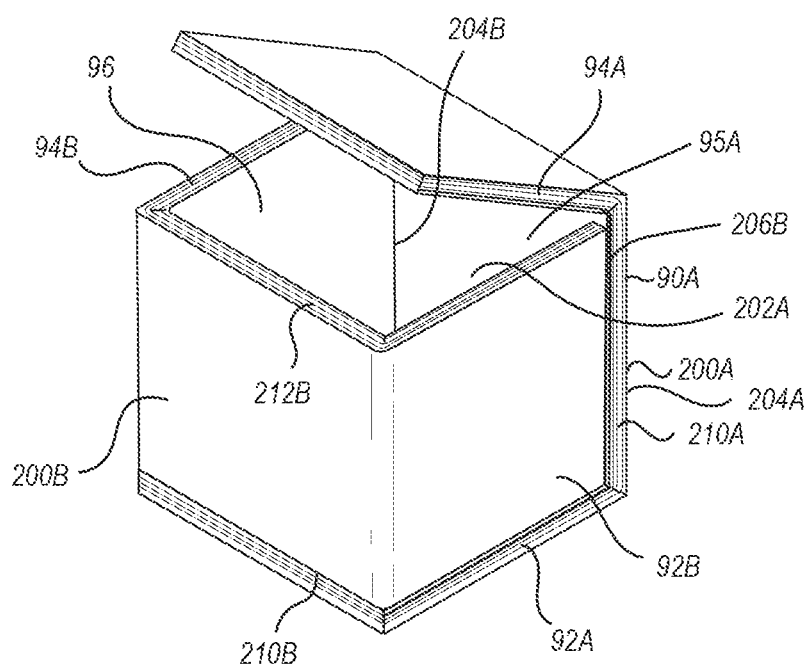
FIG. 26 is a perspective view of the assembled insulation sheets shown in FIG. 25.

With liner portions 200A and 200B produced, the packaging system is assembled by inserting liner portions 200A and 200B, i.e., liner 14D, into interior volume 22 of container 12 so that liner 14D bounds a compartment 96 within interior volume 22. Although not required, in some embodiments, liner 14D can directly sit against interior surface 20 of container 12. In still other embodiments, liner 14D can cover or substantially cover all of interior surface 20 of container 12. FIG. 26 shows how liner portions 200A and 200B are fit together when they are enclosed within container 12. Container 12 is not shown in FIG. 26 to better show the positioning of liner portions 200A and 200B.

Liner portions 200A and 200B are fit together by liner portion 200B being rotated degrees relative to liner portion 200A and being inserted within channel 95A of liner portion 200A. Liner portion 200B is fitted so that leg 92B of liner portion 200B abuts against interior surface 202A of back 90A and vertically extends between interior surfaces 202A of legs 92A and 94A at a first side of liner portion 200A. Similarly, leg 94B of liner portion 200B abuts against the interior surface 202A of back 90A and vertically extends between the interior surfaces 202A of legs 92A and 94A of liner portion 200A at an opposing second side of liner portion 200A. Back 90B of liner portion 200B extends between the interior surface 202A of leg 92A and leg 94A of liner portion 200A at the free ends of legs 92A and 94A. With liner portions 200A and 200B fitted together, they bound a compartment 96 typically having a parallelepiped configuration. Liner portions 200A and 220B are typically designed to fit close together so as to minimize in gaps therebetween.

Figure 8:
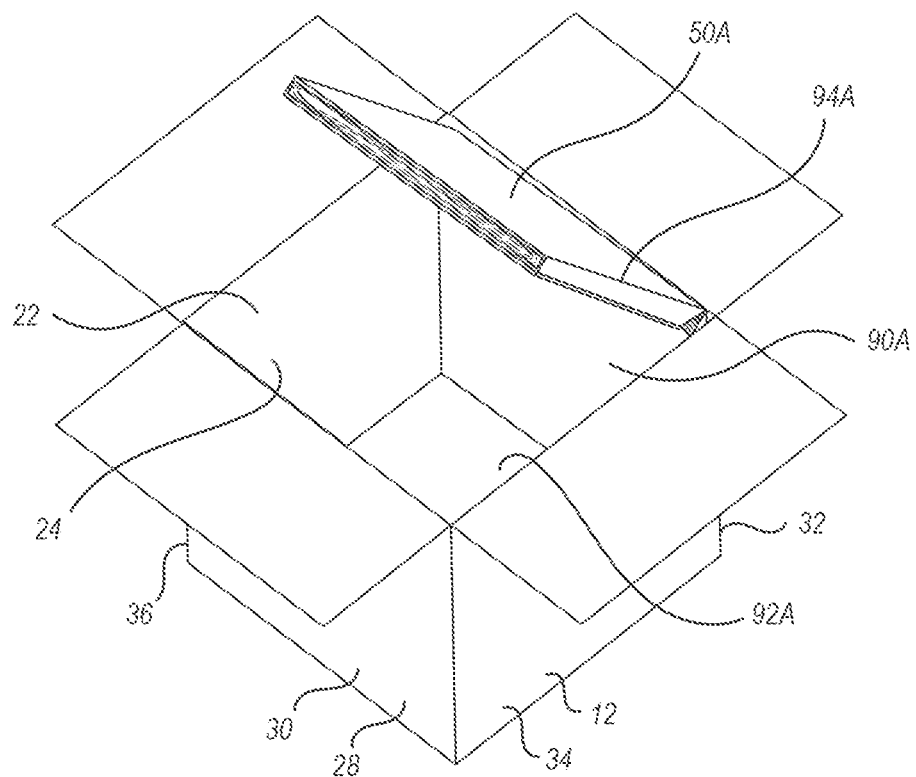
FIG. 8 is a perspective view of a first of the liner portions shown in FIG. 1 inserted within the container.

In one method of assembly, liner portion 200A and 200BB can first be fitted together, as shown in FIG. 26, and then slid into interior volume 22 of container 12 (Figure More commonly, however, the same as previously discussed with regard to liner portions 50A and 50B in association with FIGS. 8 and 9, liner portion 200A can first inserted into interior volume 22 of container 12 by positioning first leg 92A on top of bottom wall 28 and positioning back 90A against encircling sidewalls 24. Back 90A can be disposed against back wall 32 but in other embodiments, it could also be placed against any of walls 30, 34, or 36. First leg 92A can be sized to cover all or substantially all of bottom wall 28 and back 90A can be sized to cover all or substantially all of back wall 32. In this configuration, second leg 94A can still freely pivot.

Next, the same as previously discussed with regard to the embodiment in FIG. 9, liner portion 200B is fitted within channel 95A of liner portion 200A. In this position, liner portion 200B has the same position relative to liner portion 200A as discussed above with regard to FIG. 26 and the combination bounds compartment 96. In addition, legs 92B and 94B can be disposed directly against the interior face of sidewalls 34 and 36, respectively, of container 12 and back 90B can be disposed directly against the interior surface of front wall 30 (FIG. 25). As previously noted, the combinations of liner portion 200A and liner portion 200B, i.e., liner 14D, can cover all or substantially all of interior surface 20 container 12 when container 12 is folded closed. In the assembled configuration, exterior surface 204 of each liner portion 200A and 200B is disposed adjacent, such as by being disposed directly against, container 12 while opposing interior surfaces 202 disposed adjacent to, such as by directly bounding, compartment 96 configured to receive the item for shipping 102. Cold source 100 and item for shipping 102 can be positioned within compartment 96 of liner 14D the same as previously discussed with regard to liner 14A and FIGS. 10-11.

Because insulation sheets 56A1 are more rigid and thus less susceptible to collapsing or compression, relative to insulation sheets 56A, insulation sheets 56A1 can be used to independently form liner portions 200A and 200B without sleeves 52. By eliminating the use of sleeves 52, manufacturing and assembly is simplified and the resulting packaging assembly can be small and/or lighter while still having at least the same thermal efficiency. Other advantages also exist.

In addition to independently using insulation sheets 56A1 to form liners 200A and 200B, it is also appreciated that insulation sheets 56A1 can also be used to independently form first liner portion 114, second liner portion 116 and third liner portion 118 of liner 14B, previously discussed with regard to FIG. 13. The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A temperature insulated packaging system, the packaging system comprising:
   a container having interior surface bounding an interior volume;
   a cold source disposed within the container; and
   a liner disposed within the interior volume of the container and at least partially bounding a compartment configured to receive an item for shipping, the liner comprising:
      a first sleeve comprised of a first cellulose material and at least partially bounding a channel, the first sleeve having an outside wall disposed toward the container and an opposing inside wall disposed toward the compartment configured to receive the item for shipping, the channel being disposed between the inside wall and the outside wall; and
      a plurality of overlapping insulation sheets disposed within the channel of the first sleeve, the plurality of overlapping insulation sheets being comprised of a second cellulose material and having a plurality of recesses formed thereon,
   wherein the cellulose material of the first sleeve and the second cellulose material of the at least one insulation sheet comprises the same cellulose material.

2. The temperature insulated packaging system of claim 1, wherein the cellulose material of the first sleeve comprises a folded sheet of paperboard.

3. The temperature insulated packaging system of claim 2, wherein the sheet of paperboard is more rigid than the plurality of overlapping insulation sheets and/or has a thickness that is greater than a thickness of the at least one insulation sheet.

4. The temperature insulated packaging system of claim 2, wherein the paperboard comprises a tab and a slot, the tab being received within the slot so as to secure the paperboard in a continuous loop that encircles the channel.

5. The temperature insulated packaging system of claim 1, further comprising:
   the first sleeve having a terminal end face with an opening that communicates with the channel; and
   a cover flap projecting from the first sleeve, the cover flap being folded so as to at least partially cover the opening.

6. The temperature insulated packaging system of claim 1, wherein the outside wall of the first sleeve is disposed directly against the interior surface of the container and the interior wall of the first sleeve at least partially bounds the compartment.

7. The temperature insulated packaging system of claim 1, wherein the first sleeve disposed within the interior volume of the container has a U-shaped configuration.

8. The temperature insulated packaging system of claim 1, wherein the liner further comprises:
   a second sleeve at least partially bounding a channel, the second sleeve having an outside wall disposed toward the container and an opposing inside wall disposed toward the compartment configured to receive the item for shipping, the channel of the second sleeve being disposed between the inside wall and the outside wall of the second sleeve, the second sleeve being separate and discrete from the first sleeve and being positioned so that the compartment is at least partially disposed between the first sleeve and the second sleeve; and
   a plurality of overlapping insulation sheets, disposed within the channel of the second sleeve, the plurality of overlapping insulation sheets, being comprised of a cellulose material and having a plurality of recesses formed thereon.

9. The temperature insulated packaging system of claim 8, further comprising a first locking tab projecting from the first sleeve and a first locking slot being formed on the second sleeve, the first locking tab being received within the first locking slot so as to secure the first sleeve to the second sleeve.

10. The temperature insulated packaging system of claim 8, further comprising:
   the second sleeve having a first terminal end face with an opening that communicates with the channel;
   a first cover flap projecting from the second sleeve; a first locking tab projecting from the first cover flap;
   a first locking slot being formed on the second sleeve, the first locking tab being received within the first locking slot so as to secure the first sleeve to the second sleeve.

11. The temperature insulated packaging system of claim 1, wherein the plurality of overlapping insulation sheets comprises:
   a first flat sheet having a top surface and an opposing bottom surface; and
   a first embossed sheet having a top surface, an opposing bottom surface, and a plurality of spaced apart first embossings, each first embossing outwardly projecting from the top surface and terminating at a terminal end and bounding a recess openly exposed on the bottom surface, the terminal end of the first embossings being secured to the bottom surface of the first flat sheet by an adhesive.

12. The temperature insulated packaging system of claim 11, wherein the plurality of overlapping insulation sheets further comprises:
   a second flat sheet having a top surface and an opposing bottom surface; and the first embossed sheet further comprising a plurality of spaced apart second embossings, each second embossing outwardly projecting from the bottom surface and terminating at a terminal end and bounding a recess openly exposed on the top surface, the terminal end of the second embossings being secured to the top surface of the second flat sheet by an adhesive so that the first embossed sheet is disposed between the first flat sheet and the second flat sheet.

13. The temperature insulated packaging system of claim 12, further comprising a second embossed sheet having a plurality of outwardly projecting embossings, the embossings of the second embossed sheet being secured to the top surface of the first flat sheet by an adhesive.

14. The temperature insulated packaging system of claim 1, wherein the at least one insulation sheet in the plurality of overlapping insulation sheets comprises a plurality of vertically stacked insulation sheets, a plurality of pockets being bound between the plurality of vertically stacked insulation sheets.

15. The temperature insulated packaging system of claim 1, wherein the container and the liner do not comprise expanded polystyrene or non-biodegradable plastics.

16. The temperature insulated packaging system of claim 1, wherein the first sleeve further comprises:
   a first sidewall and an opposing second sidewall that each extend between the outside wall and the inside wall; and
   a first slot and a spaced apart second slot that pass through the inside wall so as to communicate with the channel and extend between the first side wall and the second sidewall.

17. The temperature insulated packaging system of claim 1, wherein the cellulose material of the first sleeve and the second cellulose material of the at least one insulation sheet comprises different cellulose material.

18. The temperature insulated packaging system of claim 1, wherein the cold source comprises a gel pack or dry ice.

\* \* \* \* \*